(12) United States Patent
Yoshida et al.

(10) Patent No.: US 8,297,045 B2
(45) Date of Patent: Oct. 30, 2012

(54) EXHAUST GAS TREATING APPARATUS AND TREATING METHOD

(75) Inventors: Keiichiro Yoshida, Osaka (JP); Masaaki Okubo, Osaka (JP)

(73) Assignees: Osaka Prefecture University Public Corporation, Osaka (JP); Japan Science and Technology Agency, Saitama (JP)

( * ) Notice: Subject to any disclaimer, the term of this patent is extended or adjusted under 35 U.S.C. 154(b) by 331 days.

(21) Appl. No.: 12/667,938

(22) PCT Filed: Aug. 28, 2008

(86) PCT No.: PCT/JP2008/065441
§ 371 (c)(1),
(2), (4) Date: Jan. 6, 2010

(87) PCT Pub. No.: WO2009/031454
PCT Pub. Date: Mar. 12, 2009

(65) Prior Publication Data
US 2011/0011059 A1    Jan. 20, 2011

(30) Foreign Application Priority Data

Sep. 4, 2007 (JP) ................. 2007-229143

(51) Int. Cl.
*F01N 3/00* (2006.01)
*F01N 3/02* (2006.01)
*B01J 19/08* (2006.01)

(52) U.S. Cl. ............... 60/297; 60/275; 60/296; 60/298; 60/311; 60/320; 422/186.03; 422/186.04

(58) Field of Classification Search .............. 60/275, 60/295, 296, 297, 298, 311, 320; 422/186.03, 422/186.04; 423/210, 213.2, 213.7, 220, 423/230, 235, 239.1, 242.1, 245.3, 246, 247

See application file for complete search history.

(56) References Cited

U.S. PATENT DOCUMENTS

| | | | |
|---|---|---|---|
| 4,336,159 A * | 6/1982 | Winter | ............................ 502/34 |
| 5,497,619 A | 3/1996 | Yamada et al. | |
| 5,499,501 A | 3/1996 | Kato et al. | |

(Continued)

FOREIGN PATENT DOCUMENTS

EP    1 683 565    7/2006

(Continued)

*Primary Examiner* — Kenneth Bomberg
*Assistant Examiner* — Anthony Ayala Delgado
(74) *Attorney, Agent, or Firm* — Hamre, Schumann, Mueller & Larson, P.C.

(57) ABSTRACT

An exhaust gas treating apparatus includes an adsorption tower (20) that has an adsorption layer filled with an adsorbent and a heat transfer path through which heat is transferred to the adsorption layer. The apparatus performs switching among the following processes: an adsorption process of introducing an exhaust gas from an engine (10) into the adsorption layer of the adsorption tower so that target components to be treated, including $NO_X$, in the exhaust gas are adsorbed by the adsorbent; a desorption process of introducing the exhaust gas into the heat transfer path of the adsorption tower to heat the adsorption layer and introducing a desorption gas into the heated adsorption layer so that the target components are desorbed from the adsorbent, and a cooling process of introducing a cooling gas into the adsorption layer of the adsorption tower to cool the adsorption layer and introducing the cooling gas that has passed through the adsorption layer into an inlet of the engine. Thus, the apparatus can treat the exhaust gas with a small amount of energy consumption and without performing a wet treatment.

18 Claims, 23 Drawing Sheets

U.S. PATENT DOCUMENTS

| | | | |
|---|---|---|---|
| 5,603,215 A * | 2/1997 | Sung et al. | 60/274 |
| 6,089,014 A * | 7/2000 | Day et al. | 60/274 |
| 6,502,388 B2 * | 1/2003 | Takaku et al. | 60/285 |
| 2005/0247049 A1 * | 11/2005 | Kaboord et al. | 60/286 |

FOREIGN PATENT DOCUMENTS

| | | |
|---|---|---|
| JP | 2000-117049 | 4/2000 |
| JP | 2004-068797 | 3/2004 |
| JP | 2004-239098 | 8/2004 |
| JP | 2004-275805 | 10/2004 |
| JP | 2006-132483 | 5/2006 |
| JP | 2007-187136 | 7/2007 |
| WO | 2005/037412 | 4/2005 |

* cited by examiner

———————— Flow path through which a gas flows

- - - - - - - - - Flow path through which no gas flows

⋈ Open valve

▶◀ Closed valve

◯ Three-way valve

FIG. 2

EXHAUST GAS TREATING APPARATUS AND TREATING METHOD

TECHNICAL FIELD

The present invention relates to an apparatus and method for treating an exhaust gas emitted from an engine such as an internal combustion engine. In particular, the present invention relates to an apparatus and method for treating an exhaust gas containing $NO_X$.

BACKGROUND ART

As the regulations on an exhaust gas emitted from the exhaust system of an engine such as an internal combustion engine, a boiler, or a gas turbine are strengthened, various improvements with regard to the engine, such as modifying the fuel composition, recirculating the exhaust gas back into the engine, and improving the combustion process itself, have been made. On the other hand, there has been an attempt to remove harmful components such as nitrogen oxides ($NO_X$) in the exhaust gas emitted from the engine.

Patent Document 1 discloses a method including the following processes. First, $NO_X$ in an exhaust gas is oxidized to $NO_2$ by applying low-temperature non-equilibrium plasma to the exhaust gas. Then, the exhaust gas is introduced into a reducing agent solution to remove the $NO_2$ from the exhaust gas.

Patent Document 2 discloses a method including the following processes. First, an exhaust gas is introduced into a first plasma reactor in which an adsorbent adsorbs target components to be treated, including $NO_X$, in the exhaust gas. Then, a nitrogen gas with a low oxygen concentration is introduced into the first plasma reactor to generate electric discharge, and non-thermal plasma of the nitrogen gas is applied to the adsorbent. Thus, the target components are desorbed from the adsorbent, so that the adsorbent is recycled. Subsequently, the nitrogen gas containing the desorbed target components is introduced into a second plasma reactor in which non-thermal plasma is applied, thereby reducing $NO_X$ to $N_2$.

Patent Document 1: JP 2000-117049 A
Patent Document 2: WO 2005/037412 A1

DISCLOSURE OF INVENTION

Problem to be Solved by the Invention

However, in the method of Patent Document 1, the reducing agent solution needs to be replenished at any time to treat the exhaust gas continuously. This increases the labor of maintaining and controlling the exhaust gas treatment function. Moreover, since the method requires a wet treatment using the reducing agent solution, it is actually difficult to apply this method to a mobile body such as an automobile.

In the method of Patent Document 2, the non-thermal plasma is used not only for the reduction of $NO_X$, but also for the recycling of the adsorbent in the first plasma reactor. Therefore, the amount of energy consumption is increased to generate the non-thermal plasma.

The present invention has the objects of solving the above conventional problems and providing an exhaust gas treating apparatus and an exhaust gas treating method that can treat the exhaust gas with a small amount of energy consumption and without performing a wet treatment.

Means for Solving Problem

A first exhaust gas treating apparatus of the present invention treats an exhaust gas emitted from an engine and includes an adsorption tower that has an adsorption layer filled with an adsorbent and a heat transfer path through which heat is transferred to the adsorption layer. The apparatus performs switching among the following processes: an adsorption process of introducing the exhaust gas into the adsorption layer of the adsorption tower so that target components to be treated, including $NO_X$, in the exhaust gas are adsorbed by the adsorbent; a desorption process of introducing the exhaust gas into the heat transfer path of the adsorption tower to heat the adsorption layer and introducing a desorption gas into the heated adsorption layer so that the target components are desorbed from the adsorbent; and a cooling process of introducing a cooling gas into the adsorption layer of the adsorption tower to cool the adsorption layer and introducing the cooling gas that has passed through the adsorption layer into an inlet of the engine.

A second exhaust gas treating apparatus of the present invention treats an exhaust gas emitted from an outlet of an engine and includes the following: an adsorption tower that has an adsorption layer filled with an adsorbent and a heat transfer path through which heat is transferred to the adsorption layer; an exhaust gas flow path between the outlet and the adsorption layer for introducing the exhaust gas emitted from the outlet into the adsorption layer of the adsorption tower; an exhaust gas flow path between the outlet and the heat transfer path for introducing the exhaust gas emitted from the outlet into the heat transfer path of the adsorption tower; a desorption gas flow path for introducing a desorption gas into the adsorption layer; a cooling gas flow path for introducing a cooling gas into the adsorption layer; and a cooling gas flow path between the adsorption layer and an inlet for introducing the cooling gas that has passed through the adsorption layer into the inlet of the engine.

An exhaust gas treating method of the present invention treats an exhaust gas emitted from an outlet of an engine using the second exhaust gas treating apparatus of the present invention and includes switching among the following processes: an adsorption process of opening the exhaust gas flow path between the outlet and the adsorption layer and closing the exhaust gas flow path between the outlet and the heat transfer path, the desorption gas flow path, the cooling gas flow path, and the cooling gas flow path between the adsorption layer and the inlet; a desorption process of opening the exhaust gas flow path between the outlet and the heat transfer path and the desorption gas flow path and closing the exhaust gas flow path between the outlet and the adsorption layer, the cooling gas flow path, and the cooling gas flow path between the adsorption layer and the inlet; and a cooling process of opening the cooling gas flow path and the cooling gas flow path between the adsorption layer and the inlet and closing the exhaust gas flow path between the outlet and the adsorption layer, the exhaust gas flow path between the outlet and the heat transfer path, and the desorption gas flow path.

Effects of the Invention

In the first plasma treatment apparatus of the present invention, the cooling gas that has passed through the adsorption layer is introduced into the inlet of the engine in the cooling process. Moreover, the second plasma treatment apparatus of the present invention includes the cooling gas flow path between the adsorption layer and the inlet for introducing the cooling gas that has passed through the adsorption layer into the inlet of the engine. Thus, at least a part of $NO_X$ introduced along with the cooling gas into the engine is decomposed by the engine. Accordingly, the total amount of $NO_X$ emission can be reduced with a smaller amount of energy consumption, compared to the case where the cooling gas that has passed through the adsorption layer is not introduced into the inlet of the engine.

In the first plasma treatment apparatus of the present invention, the thermal energy of the exhaust gas is used to desorb the target components including $NO_X$ from the adsorbent and to recycle the adsorbent. Moreover, the second plasma treatment apparatus of the present invention includes the exhaust gas flow path between the outlet and the heat transfer path for introducing the exhaust gas emitted from the outlet of the engine into the heat transfer path of the adsorption tower. In this regard, therefore, the amount of energy consumption can be reduced.

Further, no wet process is used to treat the target components including $NO_X$ in the exhaust gas. This can facilitate maintenance and control and make it easy to apply the present invention to a mobile body such as an automobile.

BRIEF DESCRIPTION OF DRAWINGS

FIG. 2 is a diagram showing the meanings of various symbols used in the diagrams of the gas flows in the processes of exhaust gas treating apparatuses of Embodiments 1 to 4.

BEST MODE FOR CARRYING OUT THE INVENTION

Figure 1A:
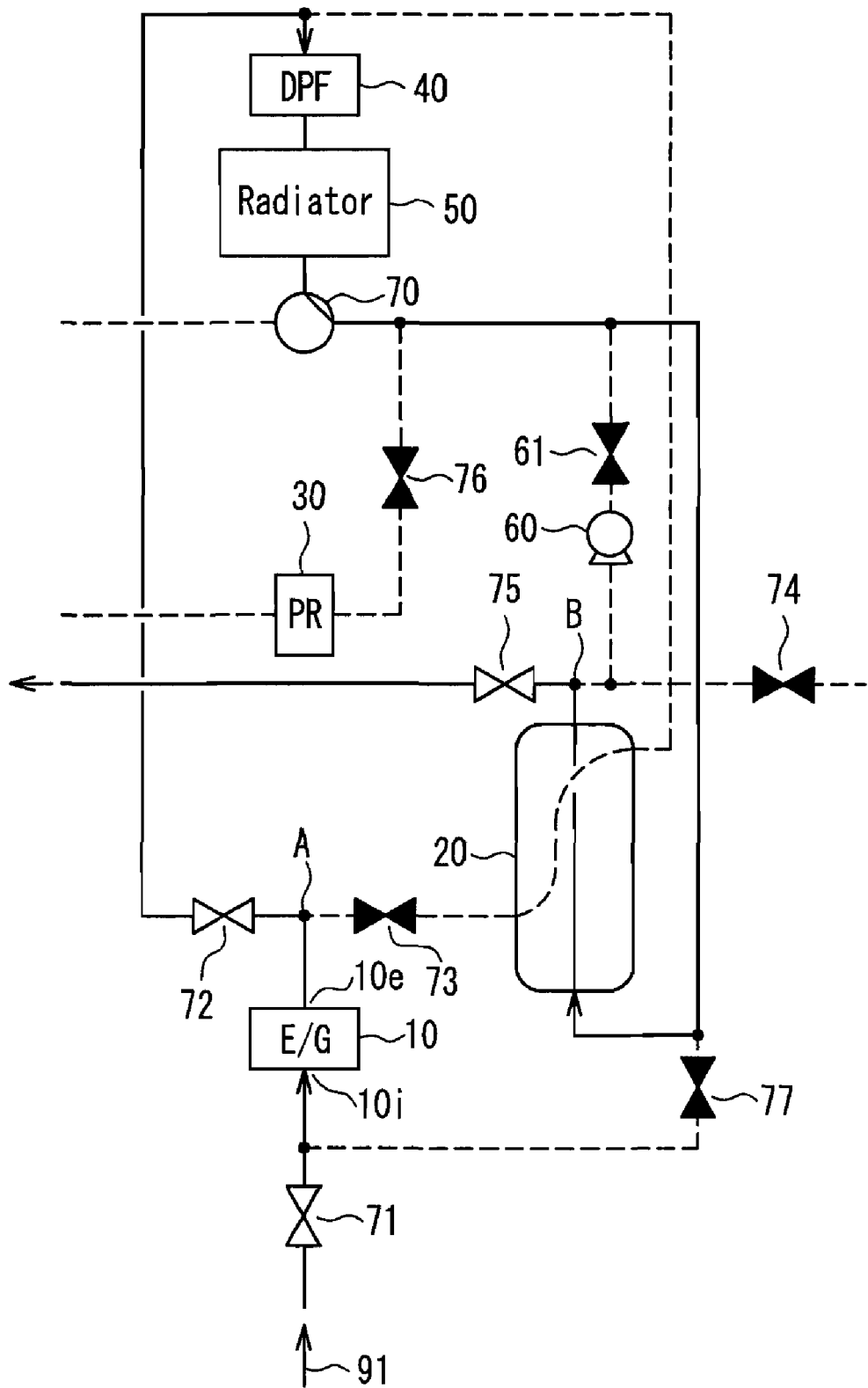
FIG. 1A is a diagram showing a gas flow in an adsorption process of an exhaust gas treating apparatus of Embodiment 1 of the present invention.

In the present invention, the engine means a machine or device that converts thermal energy generated by the combustion of a fuel into power, and may be either an internal combustion engine or an external combustion engine. In particular, a diesel engine is suitable.

$NO_X$ means nitrogen oxides such as NO, $NO_2$, $N_2O$, and $N_2O_5$. In addition to these nitrogen oxides, the target components also may include sulfur oxides ($SO_X$) such as $SO_2$ and $SO_3$, volatile organic compounds (VOCs) such as toluene, benzene, and xylene, pollutants such as dioxins, halogenated aromatic substances, and highly condensed aromatic hydrocarbons, hydrocarbons, CO, $CO_2$, and water vapor ($H_2O$).

In the present invention, the target components are adsorbed by the adsorbent in the adsorption process and desorbed (or eliminated) by heating the adsorbent in the desorption process, and the cooling gas that has passed through the adsorption layer is introduced into the inlet of the engine in the cooling process.

It is preferable that the adsorption layer filled with the adsorbent and the heat transfer path for heating the adsorbent in the adsorption layer are independent of each other. With this configuration, in the desorption process, the exhaust gas for heating the adsorbent can be separated from the desorption gas for conveying the target components desorbed from the heated adsorbent. Thus, the target components can be desorbed efficiently from the adsorbent.

It is preferable that in the cooling process, at least a part of the exhaust gas is introduced into the adsorption layer as the cooling gas. With this configuration, so-called exhaust gas recirculation is conducted to reduce the oxygen concentration in the intake air of the engine. Thus, the combustion temperature is lowered, and the amount of $NO_X$ generated can be reduced further.

It is preferable that the first exhaust gas treating apparatus of the present invention further includes a plasma reactor in which the desorption gas containing the target components desorbed from the adsorbent in the desorption process is subjected to a plasma treatment. With this configuration, the target components including $NO_X$ desorbed from the adsorbent can be treated, and the amount of the target components emitted outside the system can be reduced further.

The plasma reactor may include a surface discharge element that generates surface discharge. With this configuration, plasma can be applied efficiently to the target components.

In this case, it is preferable that the plasma reactor has a gas flow control shape for controlling a flow path of the desorption gas so that the desorption gas flows along the surface of the surface discharge element on which the surface discharge is generated. This configuration allows the desorption gas to pass through the plasma generation region reliably, and thus can ensure the treatments of the target components.

It is preferable that the desorption gas is a low oxygen gas with an oxygen concentration of 10 vol % or less. By performing a plasma treatment in such a low oxygen gas atmosphere, the removal rate of $NO_X$ can be improved.

It is preferable that the low oxygen gas is at least a part of the exhaust gas that has passed through the heat transfer path in the desorption process. With this configuration, there is no need to prepare, e.g., a nitrogen gas separately as the low oxygen gas, and the exhaust gas can be utilized effectively. Thus, a small low-cost exhaust gas treating apparatus can be achieved.

In the desorption process, a part of the desorption gas that has passed through the adsorption layer may be reintroduced into the adsorption layer. With this configuration, the target components can be desorbed efficiently from the adsorbent using a limited amount of the desorption gas.

It is preferable that the desorption gas containing the target components desorbed from the adsorbent in the desorption process is introduced into the inlet of the engine. With this configuration, the target components including $NO_X$ desorbed from the adsorbent can be treated in the engine, and the amount of the target components emitted outside the system can be reduced further. Moreover, the plasma reactor is not necessary.

In this case, it is preferable that the desorption gas is at least a part of the exhaust gas that has passed through the heat transfer path in the desorption process. With this configuration, so-called exhaust gas recirculation is conducted to reduce the oxygen concentration in the intake air of the engine. Thus, the combustion temperature is lowered, and the amount of $NO_X$ generated can be reduced further.

It is preferable that the first exhaust gas treating apparatus of the present invention further includes a dehumidifying agent for dehumidifying the exhaust gas that passes through the adsorption layer in the adsorption process. With this configuration, the adsorption ability of the adsorbent can be improved.

The first exhaust gas treating apparatus of the present invention may include a plurality of the adsorption towers and switch between the adsorption towers every time a set of three processes consisting of the adsorption process, the desorption process, and the cooling process is performed, each adsorption tower performing the three processes. With this configuration, the target components can be treated efficiently using a plurality of the adsorption towers.

In this case, it is preferable that one of the adsorption towers is used to perform a set of three processes consisting of the adsorption process, the desorption process, and the cooling process, while the adsorbent of the other adsorption tower adsorbs the target components including $NO_X$ in the exhaust gas. With this configuration, the amount of the target components emitted outside the system can be reduced.

In the second exhaust gas treating apparatus of the present invention, it is preferable that the cooling gas includes the exhaust gas emitted from the outlet. With this configuration, so-called exhaust gas recirculation is conducted to reduce the oxygen concentration in the intake air of the engine. Thus, the combustion temperature is lowered, and the amount of $NO_X$ generated can be reduced further.

It is preferable that the second exhaust gas treating apparatus of the present invention further includes a plasma reactor in which the desorption gas that has passed through the adsorption layer is subjected to a plasma treatment. With this configuration, the target components including $NO_X$ desorbed from the adsorbent can be treated, and the amount of the target components emitted outside the system can be reduced further.

It is preferable that the second exhaust gas treating apparatus of the present invention further includes a desorption gas circulation path for introducing a part of the desorption gas that has passed through the adsorption layer into the adsorption layer. With this configuration, the target components can be desorbed efficiently from the adsorbent using a limited amount of the desorption gas.

It is preferable that the second exhaust gas treating apparatus of the present invention further includes a desorption gas flow path between the adsorption layer and the inlet for introducing the desorption gas that has passed through the adsorption layer into the inlet of the engine. With this configuration, the target components including $NO_X$ desorbed from the adsorbent can be treated in the engine, and the amount of the target components emitted outside the system can be reduced further. Moreover, the plasma reactor is not necessary.

Hereinafter, the present invention will be described in more detail by way of specific examples. Needless to say, the present invention is not limited to the following specific examples.

Embodiment 1

Figure 1B:
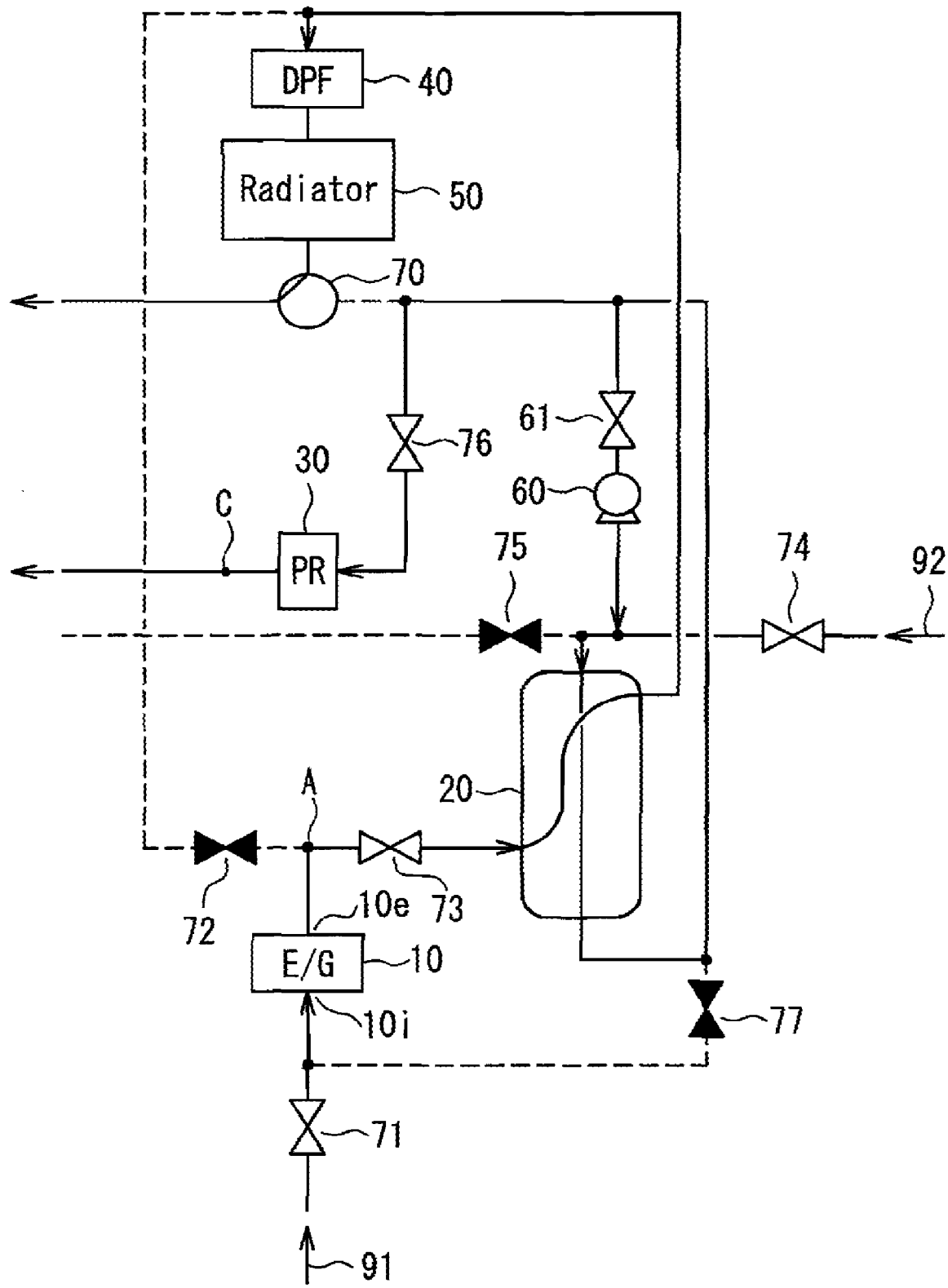
FIG. 1B is a diagram showing a gas flow in a desorption process of an exhaust gas treating apparatus of Embodiment 1 of the present invention.
Figure 1C:
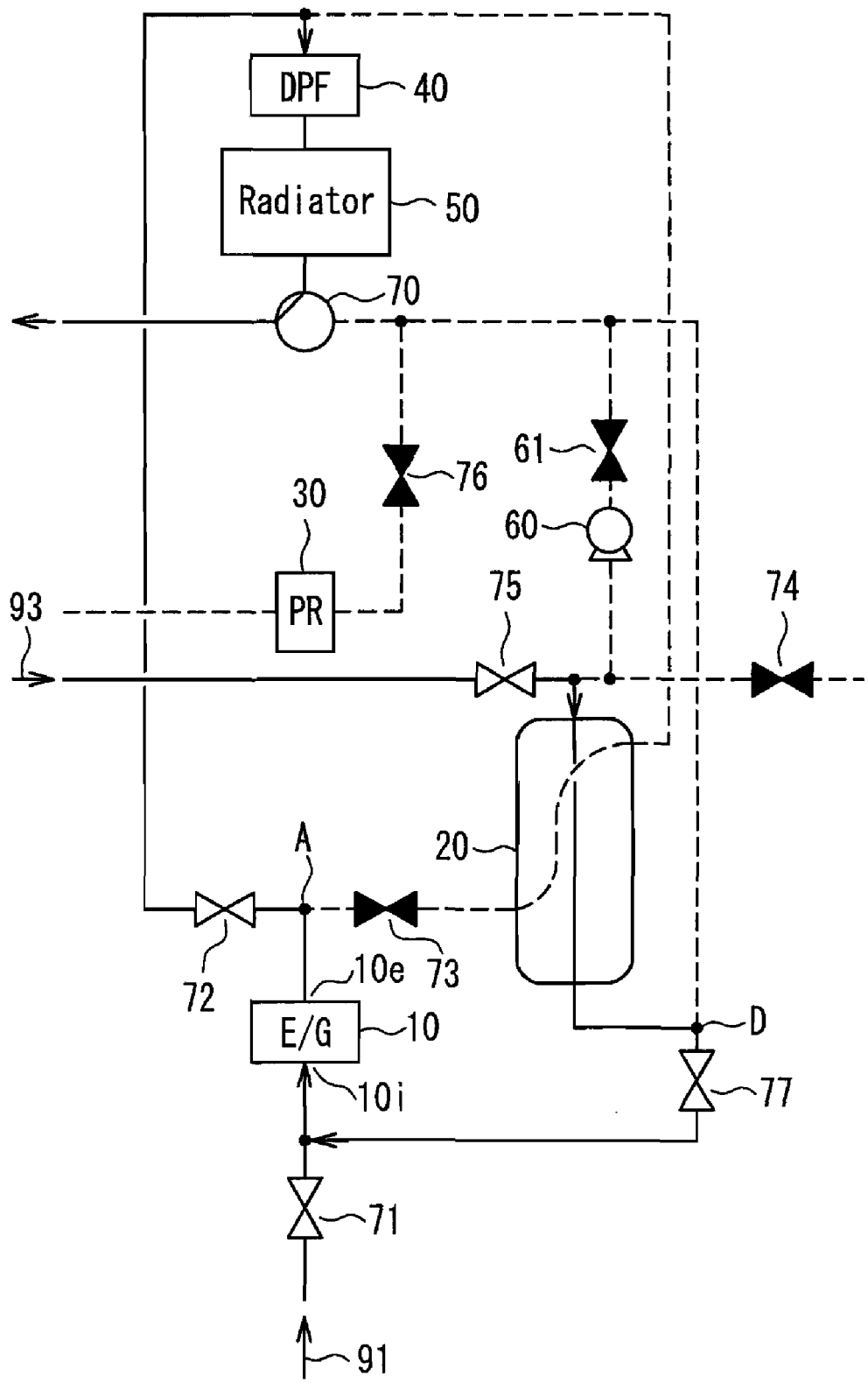
FIG. 1C is a diagram showing a gas flow in a cooling process of an exhaust gas treating apparatus of Embodiment 1 of the present invention.

FIGS. 1A, 1B, and 1C are diagrams showing gas flows in an adsorption process, a desorption process, and a cooling process of an exhaust gas treating apparatus of Embodiment 1 of the present invention, respectively. FIG. 2 shows the meanings of symbols in FIGS. 1A to 1C. As shown in FIG. 2, the solid line indicates a flow path (piping) through which a gas flows, and the dashed line indicates a flow path (piping) through which no gas flows. Avoid symbol for a valve represents an open valve, and a solid symbol for a valve represents a closed valve.

The exhaust gas treating apparatus of Embodiment 1 includes the following: an adsorption tower 20 that has an adsorption layer filled with an adsorbent and a heat transfer path through which heat is transferred to the adsorption layer; an exhaust gas flow path between an outlet and the adsorption layer; an exhaust gas flow path between the outlet and the heat transfer path; a desorption gas flow path; a cooling gas flow path; a cooling gas flow path between the adsorption layer and an inlet; and a desorption gas circulation path.

The exhaust gas flow path between the outlet and the adsorption layer is a first exhaust gas flow path that introduces an exhaust gas emitted from an outlet 10e of an engine 10 through a branch point (A) into the adsorption layer of the adsorption tower 20. In Embodiment 1, as indicated by the solid line in FIG. 1A, the first flow path extends from the outlet 10e of the engine 10, passes through the branch point (A), a valve 72, a DPF (diesel particulate filter) 40, a radiator 50, and a three-way valve 70 in this order, and reaches the adsorption tower 20.

The exhaust gas flow path between the outlet and the heat transfer path is a second exhaust gas flow path that introduces the exhaust gas emitted from the outlet 10e of the engine 10 through the branch point (A) into the heat transfer path located within the adsorption tower 20. In Embodiment 1, as indicated by the solid line in FIG. 1B, the flow path extends from the outlet 10e of the engine 10 through the branch point (A) and a valve 73 to the heat transfer path of the adsorption tower 20.

The desorption gas flow path is a first desorption gas flow path that introduces a desorption gas 92 into the adsorption layer of the adsorption tower 20. In Embodiment 1, as indicated by the solid line in FIG. 1B, the flow path extends from a valve 74 to the adsorption layer of the adsorption tower 20.

The cooling gas flow path is a first cooling gas flow path that introduces a cooling gas 93 into the adsorption layer of the adsorption tower 20. In Embodiment 1, as indicated by the solid line in FIG. 1C, the flow path extends from a valve 75 to the adsorption layer of the adsorption tower 20.

The cooling gas flow path between the adsorption layer and the inlet is a second cooling gas flow path that introduces the cooling gas that has passed through the adsorption layer of the adsorption tower 20 into an inlet 10i of the engine 10. In Embodiment 1, as indicated by the solid line in FIG. 1C, the flow path extends from the adsorption layer of the adsorption tower 20 through a valve 77 to the inlet 10i of the engine 10.

The desorption gas circulation path is a flow path that introduces a part of the desorption gas that has passed through the adsorption layer of the adsorption tower 20 into the adsorption layer. In Embodiment 1, as indicated by the solid line in FIG. 1B, the flow path extends from a desorption gas exit of the adsorption layer of the adsorption tower 20, passes through a valve 61 and a blower 60, and reaches a desorption gas intake of the adsorption layer of the adsorption tower 20.

The exhaust gas treating apparatus of this embodiment repeats a set of the adsorption process (FIG. 1A), the desorption process (FIG. 1B), and the cooling process (FIG. 1C) in this order as a repeating unit.

In the adsorption process, the adsorbent of the adsorption tower 20 adsorbs target components to be treated, including $NO_X$, in the exhaust gas emitted from the engine 10. The gas flow in the adsorption process will be described with reference to FIG. 1A. The engine 10 takes in air 91 through a valve 71 and emits an exhaust gas containing the target components including $NO_X$. The exhaust gas passes through the branch point (A) and then the valve 72 and enters the DPF 40 where particulate matters (e.g., soot) are removed from the exhaust gas. Then, the exhaust gas is cooled by the radiator 50 and passes through the three-way valve 70 and the adsorption layer of the adsorption tower 20. The adsorption layer is filled with the adsorbent, and the adsorbent adsorbs the target components including $NO_X$ in the exhaust gas when the exhaust gas passes through gaps in the adsorbent. After the target components are adsorbed, the exhaust gas passes through the valve 75 and is released into the atmosphere.

In the desorption process, the target components adsorbed by the adsorbent of the adsorption tower 20 in the adsorption process are desorbed from the adsorbent, so that the adsorbent is recycled. The adsorbent that has adsorbed the target components is heated with the use of heat of the exhaust gas, thereby desorbing the target components. The gas flow in the desorption process will be described with reference to FIG. 1B. The engine 10 takes in air 91 through the valve 71 and emits an exhaust gas containing the target components including $NO_X$. The exhaust gas passes through the branch point (A), then the valve 73 and the heat transfer path in the adsorption tower 20. When the exhaust gas passes through the heat transfer path, the thermal energy of the exhaust gas is transferred to the adsorbent of the adsorption layer in the adsorption tower 20. Consequently, the adsorbent in the adsorption tower 20 is heated, while the exhaust gas is cooled. The cooled exhaust gas enters the DPF 40 where particulate matters (e.g., soot) are removed from the exhaust gas. Then, the exhaust gas is cooled further by the radiator 50, passes through the three-way valve 70, and is released into the atmosphere. On the other hand, the desorption gas 92 passes through the valve 74 and the adsorption layer of the adsorption tower 20. Since the adsorbent in the adsorption layer has been heated by the exhaust gas, the target components adsorbed by the adsorbent are desorbed and conveyed together with the desorption gas to the outside of the adsorption tower 20. A part of the desorption gas containing the target components passes through the valve 61 and the blower 60, and then re-enters the adsorption layer of the adsorption tower 20. The remainder passes through a valve 76 and enters a plasma reactor 30. In the plasma reactor 30, the desorption gas is subjected to a plasma treatment, and $NO_X$ (the target components) contained in the desorption gas is reduced to $N_2$. Subsequently, the desorption gas containing $N_2$ is released into the atmosphere.

In the cooling process, the adsorbent of the adsorption tower 20 heated in the desorption process is cooled to a temperature at which the adsorbent can adsorb the target components. The gas flow in the cooling process will be described with reference to FIG. 1C. A large amount of air serving as the cooling gas 93 passes through the valve 75 and the adsorption layer of the adsorption tower 20. The adsorbent in the adsorption tower 20 is cooled rapidly with the air passing through the adsorption layer. The air that has passed through the adsorption tower 20 passes through the valve 77 and enters the inlet 10i of the engine 10. The engine 10 takes in both the air 91 through the valve 71 and the air through the adsorption tower 20 and emits an exhaust gas containing the target components including $NO_X$. The exhaust gas passes through the valve 72 and enters the DPF 40 where particulate matters (e.g., soot) are removed from the exhaust gas. Then, the exhaust gas is cooled by the radiator 50, passes through the three-way valve 70, and is released into the atmosphere.

As described above, in this embodiment, the air that has passed through the adsorption layer of the adsorption tower 20 in the cooling process is introduced into the inlet 10i of the engine 10. The temperature of the adsorbent is still high at the beginning of the cooling process. Therefore, the air that has passed through the adsorption layer may contain $NO_X$ (the target components). In such a case, the intake air of the engine 10 contains $NO_X$. A part of $NO_X$ in the intake air is decomposed by the engine 10. Accordingly, the total amount of $NO_X$ emitted outside the system can be reduced with a smaller amount of energy consumption, compared to the case where the air that has passed through the adsorption layer is not allowed to enter the inlet 10i of the engine 10. Moreover, the thermal energy of the exhaust gas is used to desorb the target components from the adsorbent and to recycle the adsorbent. In this regard, therefore, the amount of energy consumption can be reduced. Further, no wet process is included in the treatments of the target components, and thus conventional problems of maintenance and control of the treatment liquid do not arise.

The above embodiment is merely an example, and the present invention is not limited thereto. Thus, various modifications can be made.

In the desorption process (FIG. 1B), the desorption gas that has passed through the adsorption layer of the adsorption tower 20 is subjected to the plasma treatment in the plasma reactor 30. However, the present invention is not limited thereto. For example, when the repeating unit consisting of the adsorption process, the desorption process, and the cooling process is repeated, some of the desorption processes may include the plasma treatment and others may include no plasma treatment. In particular, the amount of $NO_X$ contained in the desorption gas that has passed through the adsorption layer of the adsorption tower 20 can be relatively small immediately after the start of the operation. In such a case, the plasma treatment may be omitted. Alternatively, no plasma treatment may be performed by removing the plasma reactor 30. The omission of the plasma treatment can reduce the energy required for this. The removal of the plasma reactor 30 further can reduce the size and cost of the apparatus.

In the desorption process (FIG. 1B), a part of the desorption gas that has passed through the adsorption layer of the adsorption tower 20 passes through the valve 61 and the blower 60, and then re-enters the adsorption layer of the adsorption tower 20. This is because a limited amount of the desorption gas supplied through the valve 74 can be used to increase the flow rate of the desorption gas that passes through the adsorption layer. Consequently, the time required for the desorption process can be made shorter. The amount (flow rate) of the desorption gas that re-enters the adsorption layer can be adjusted by changing the wind speed of the blower 60. In the present invention, however, the desorption gas circulation path including the valve 61 and the blower 60 may be omitted.

In the cooling process (FIG. 1C), not only the air that has passed through the adsorption layer of the adsorption tower 20, but also the air that has passed through the valve 71 enters the engine 10. This configuration is intended to prevent the pressure loss of the induction system due to the engine 10 from being excessively large when the valve 71 is closed. However, the present invention is not limited thereto. In the cooling process, the valve 71 may be closed, and only the air that has passed through the adsorption layer of the adsorption tower 20 may enter the engine 10.

In the cooling process (FIG. 1C), the air is used as the cooling gas 93 that is introduced into the adsorption layer of the adsorption tower 20. However, the present invention is not limited thereto. For example, at least a part of the exhaust gas that has been cooled by the radiator 50 may be used. Thus, the cooled exhaust gas passes through the adsorption layer of the adsorption tower 20, and then enters the inlet 10i of the engine 10. Therefore, so-called exhaust gas recirculation is conducted to reduce the oxygen concentration in the intake air of the engine 10. Consequently, the combustion temperature is lowered, and the content of $NO_X$ in the exhaust gas can be reduced further.

The piping diagrams of FIGS. 1A to 1C are merely examples, and the present invention is not limited thereto. For example, the three-way valve may be replaced by a valve. On the contrary, the valves may be replaced by three-way valves. Moreover, the positions of the valves and the three-way valve may be changed. For example, the valve 73 may be moved to a position on the flow path between the heat transfer path of the adsorption tower 20 and the DPF 40. This configuration can reduce the degree of heat resistance required for the valve 73.

Embodiment 2

Figure 3A:
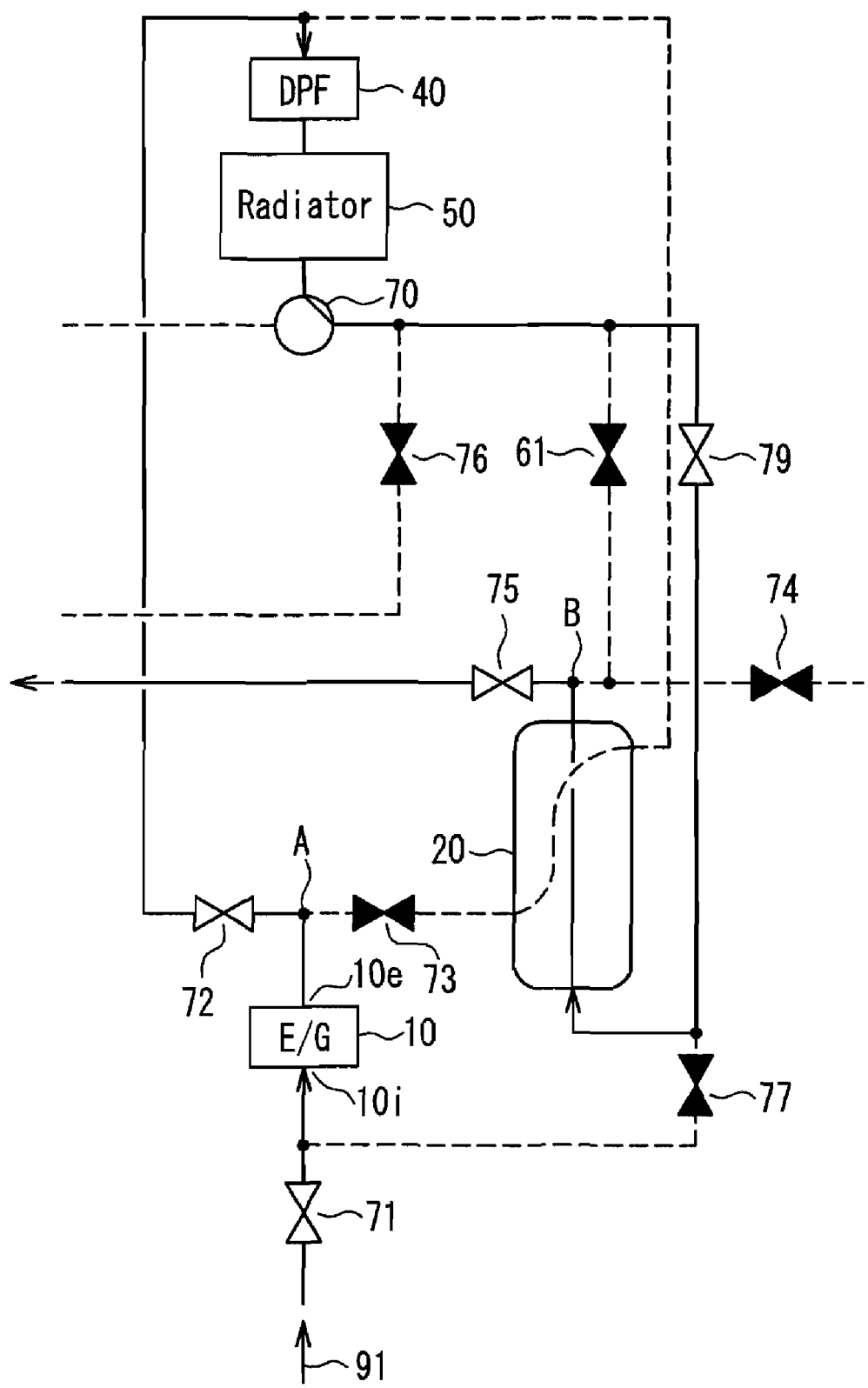
FIG. 3A is a diagram showing a gas flow in an adsorption process of an exhaust gas treating apparatus of Embodiment 2 of the present invention.
Figure 3B:
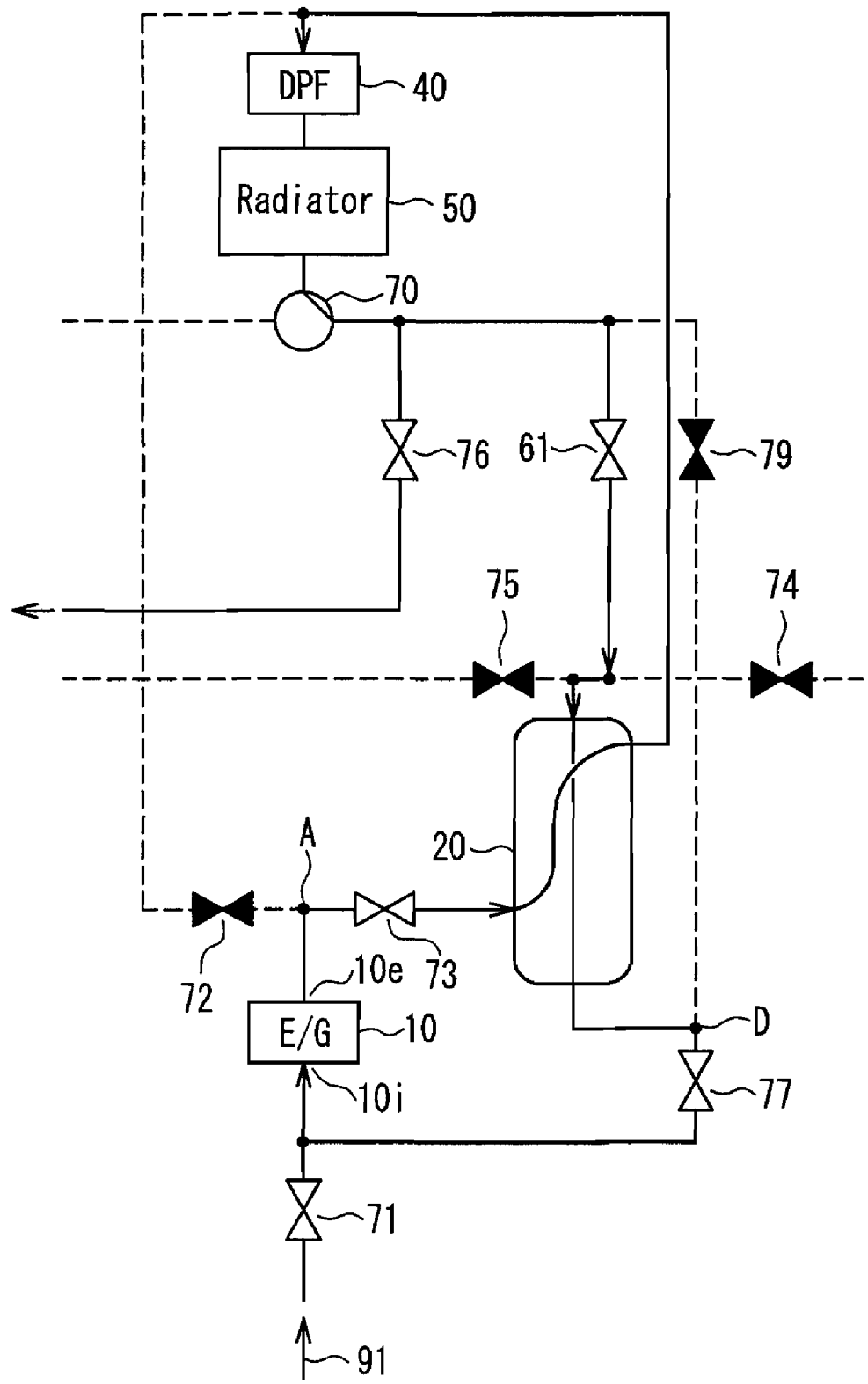
FIG. 3B is a diagram showing a gas flow in a desorption process of an exhaust gas treating apparatus of Embodiment 2 of the present invention.
Figure 3C:
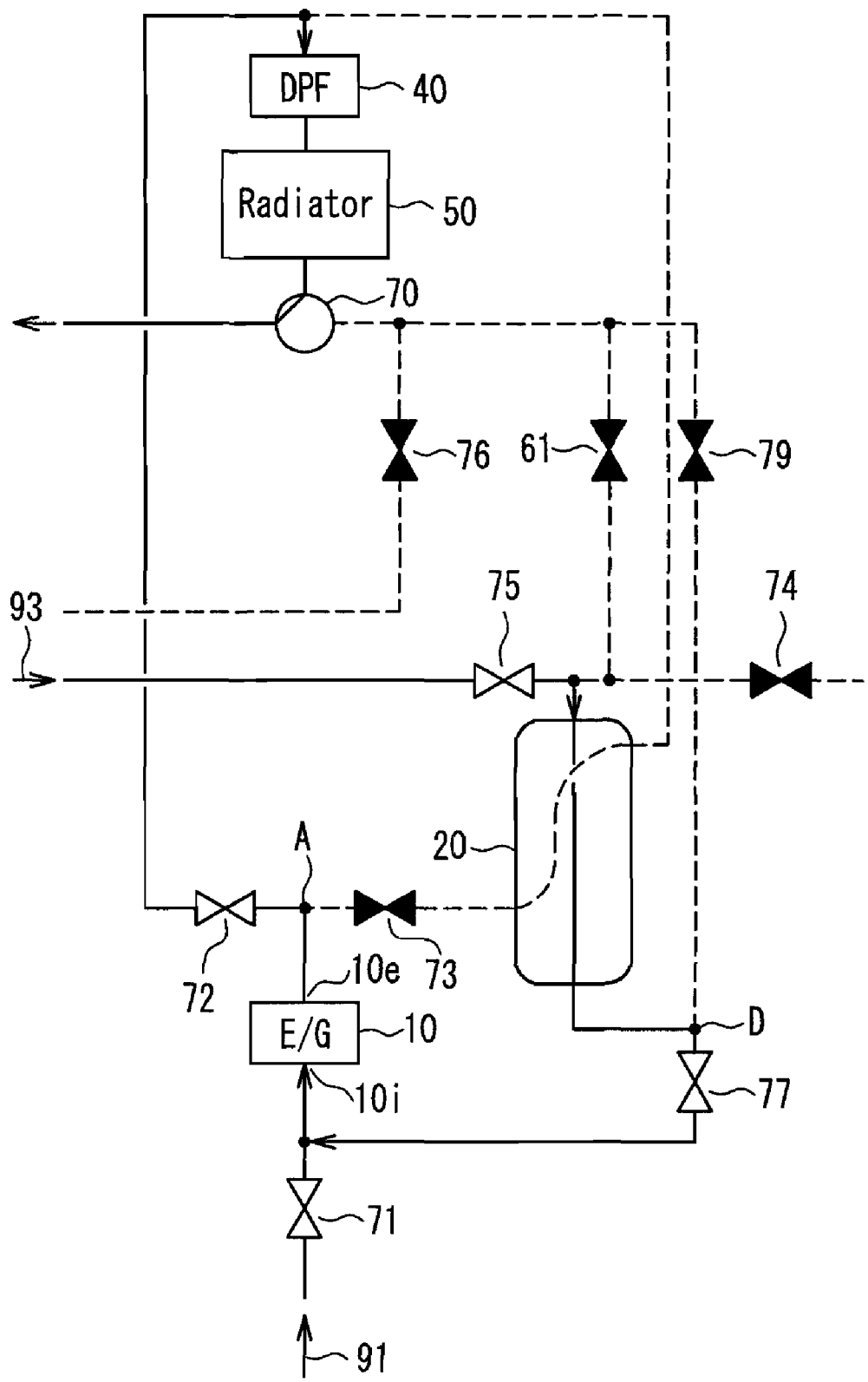
FIG. 3C is a diagram showing a gas flow in a cooling process of an exhaust gas treating apparatus of Embodiment 2 of the present invention.

FIGS. 3A, 3B, and 3C are diagrams showing gas flows in an adsorption process, a desorption process, and a cooling process of an exhaust gas treating apparatus of Embodiment 2 of the present invention, respectively. The meanings of symbols in FIGS. 3A to 3C are as shown in FIG. 2. The same members as those in FIGS. 1A to 1C are denoted by the same reference numerals, and their explanations will not be repeated.

Embodiment 2 differs from Embodiment 1 in the following two points: the blower 60 and the plasma reactor 30 are omitted; and a valve 79 is provided on a path that connects the three-way valve 70 and the valve 77 and does not contain the valve 61 and the adsorption tower 20.

The exhaust gas treating apparatus of Embodiment 2 includes the following: the adsorption tower 20 that has the adsorption layer filled with the adsorbent and the heat transfer path through which heat is transferred to the adsorption layer; the exhaust gas flow path between the outlet and the adsorption layer; the exhaust gas flow path between the outlet and the heat transfer path; the desorption gas flow path; the cooling gas flow path; the cooling gas flow path between the adsorption layer and the inlet; and a desorption gas flow path between the adsorption layer and the inlet.

The exhaust gas flow path between the outlet and the adsorption layer is a flow path that introduces an exhaust gas emitted from the outlet 10e of the engine 10 into the adsorption layer of the adsorption tower 20. In Embodiment 2, as indicated by the solid line in FIG. 3A, the flow path extends from the outlet 10e of the engine 10, passes through the valve 72, the DPF (diesel particulate filter) 40, the radiator 50, the three-way valve 70, and the valve 79 in this order, and reaches the adsorption tower 20.

The exhaust gas flow path between the outlet and the heat transfer path is a flow path that introduces the exhaust gas emitted from the outlet 10e of the engine 10 into the heat transfer path of the adsorption tower 20. In Embodiment 2, as indicated by the solid line in FIG. 3B, the flow path extends from the outlet 10e of the engine 10 through the valve 73 to the heat transfer path of the adsorption tower 20.

The desorption gas flow path is a flow path that introduces the exhaust gas that has passed through the heat transfer path of the adsorption tower 20 into the adsorption layer of the adsorption tower 20 as a desorption gas. In Embodiment 2, as indicated by the solid line in FIG. 3B, the flow path extends from the valve 61 to the adsorption layer of the adsorption tower 20.

The cooling gas flow path is a flow path that introduces the cooling gas 93 into the adsorption layer of the adsorption tower 20. In Embodiment 2, as indicated by the solid line in FIG. 3C, the flow path extends from the valve 75 to the adsorption layer of the adsorption tower 20.

The cooling gas flow path between the adsorption layer and the inlet is a flow path that introduces the cooling gas that has passed through the adsorption layer of the adsorption tower 20 into the inlet 10i of the engine 10. In Embodiment 2, as indicated by the solid line in FIG. 3C, the flow path extends from the adsorption layer of the adsorption tower 20 through the valve 77 to the inlet 10i of the engine 10.

The desorption gas flow path between the adsorption layer and the inlet is a second desorption flow path that introduces the desorption gas that has passed through the adsorption layer of the adsorption tower 20 into the inlet 10i of the engine 10. In Embodiment 2, as indicated by the solid line in FIG. 3B, the flow path extends from the adsorption layer of the adsorption tower 20 through the valve 77 to the inlet 10i of the engine 10.

The exhaust gas treating apparatus of this embodiment repeats a set of the adsorption process (FIG. 3A), the desorption process (FIG. 3B), and the cooling process (FIG. 3C) in this order as a repeating unit.

In the adsorption process (FIG. 3A), the valve 79 is opened and the same treatment as that in the adsorption process (FIG. 1A) of Embodiment 1 is performed. Therefore, a detailed explanation will not be repeated.

In the desorption process (FIG. 3B), the target components adsorbed by the adsorbent of the adsorption tower 20 in the adsorption process are desorbed from the adsorbent, so that the adsorbent is recycled. The adsorbent that has adsorbed the target components is heated with the use of heat of the exhaust gas, thereby desorbing the target components. The gas flow in the desorption process will be described. The engine 10 emits an exhaust gas containing the target components including $NO_X$ from the outlet 10e. The exhaust gas passes through the valve 73 and the heat transfer path of the adsorption tower 20. When the exhaust gas passes through the heat transfer path, the thermal energy of the exhaust gas is transferred to the adsorbent of the adsorption layer in the adsorption tower 20. Consequently, the adsorbent in the adsorption tower 20 is heated, while the exhaust gas is cooled. The cooled exhaust gas enters the DPF 40 where particulate matters (e.g., soot) are removed from the exhaust gas. Then, the exhaust gas is cooled further by the radiator 50 and passes through the three-way valve 70. Thereafter, a part of the exhaust gas passes through the valve 76 and is released into the atmosphere, and the remainder passes through the valve 61. The exhaust gas that has passed through the valve 61 enters the adsorption layer of the adsorption tower 20. Since the adsorbent in the adsorption layer has been heated by the exhaust gas passing through the heat transfer path, the target components adsorbed by the adsorbent are desorbed and conveyed together with the exhaust gas to the outside of the adsorption tower 20. The exhaust gas containing the target components passes through the valve 77 and enters the inlet 10i of the engine 10. The engine 10 takes in both the air 91 through the valve 71 and the exhaust gas containing the target components through the adsorption tower 20.

In the cooling process (FIG. 3C), the same treatment as that in the cooling process (FIG. 1C) of Embodiment 1 is performed. Therefore, a detailed explanation will not be repeated. In the cooling process, the valve 79 may be either opened or closed.

As described above, Embodiment 2 differs from Embodiment 1 in the desorption process, specifically in the following two points.

First, the gas containing $NO_X$ (the target components) desorbed from the adsorbent of the adsorption tower 20 is introduced into the inlet 10i of the engine 10. At least a part of $NO_X$ introduced into the engine 10 is decomposed by the engine 10. In Embodiment 1, a plasma treatment using the plasma reactor 30 needs to be performed to decompose $NO_X$ desorbed from the adsorbent of the adsorption tower 20 in the desorption process. In contrast, Embodiment 2 allows at least a part of $NO_X$ to be decomposed by the engine 10. Therefore, the amount of $NO_X$ emitted outside the system can be reduced even without the plasma treatment in the desorption process, and the energy required for the plasma treatment also can be reduced. Thus, Embodiment 2 can reduce not only the amount of $NO_X$ emitted outside the system, but also the energy consumption and the size and cost of the apparatus due to the removal of the plasma reactor 30.

Second, the exhaust gas of the engine 10 is used as a desorption gas that is to be introduced into the adsorption layer of the adsorption tower 20. Moreover, the exhaust gas that has passed through the adsorption layer is introduced into the inlet 10i of the engine 10. In this manner, so-called exhaust gas recirculation is conducted to reduce the oxygen concentration in the intake air of the engine 10. Consequently, the combustion temperature is lowered, and the content of $NO_X$ in the exhaust gas can be reduced further.

Like Embodiment 1, a gas other than the exhaust gas can be used as a desorption gas in the desorption process of Embodiment 2.

Except for the above, Embodiment 2 is the same as Embodiment 1 and has similar effects to those of Embodiment 1. The various modified examples described in Embodiment 1 also can be applied to Embodiment 2 without any revision or with an obvious revision. In such a case, Embodiment 2 has similar effects to those of Embodiment 1.

Embodiment 3

An exhaust gas treating apparatus of Embodiment 3 of the present invention has two adsorption towers and differs in this point from the exhaust gas treating apparatus of Embodiment 1 that has only one adsorption tower.

Figure 4A:
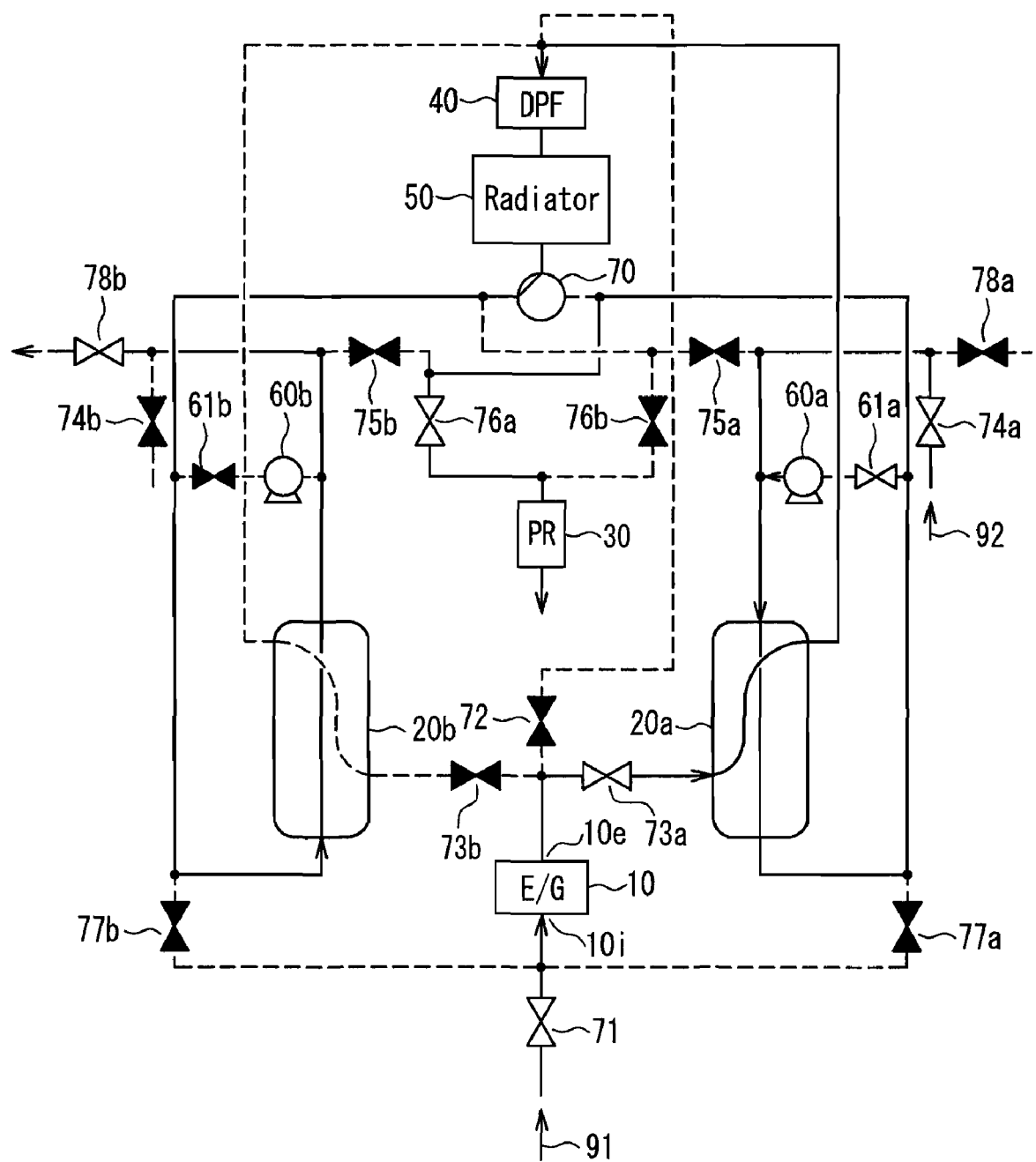
FIG. 4A is a diagram showing a gas flow in a desorption process using a first adsorption tower of an exhaust gas treating apparatus of Embodiment 3 of the present invention.
Figure 4B:
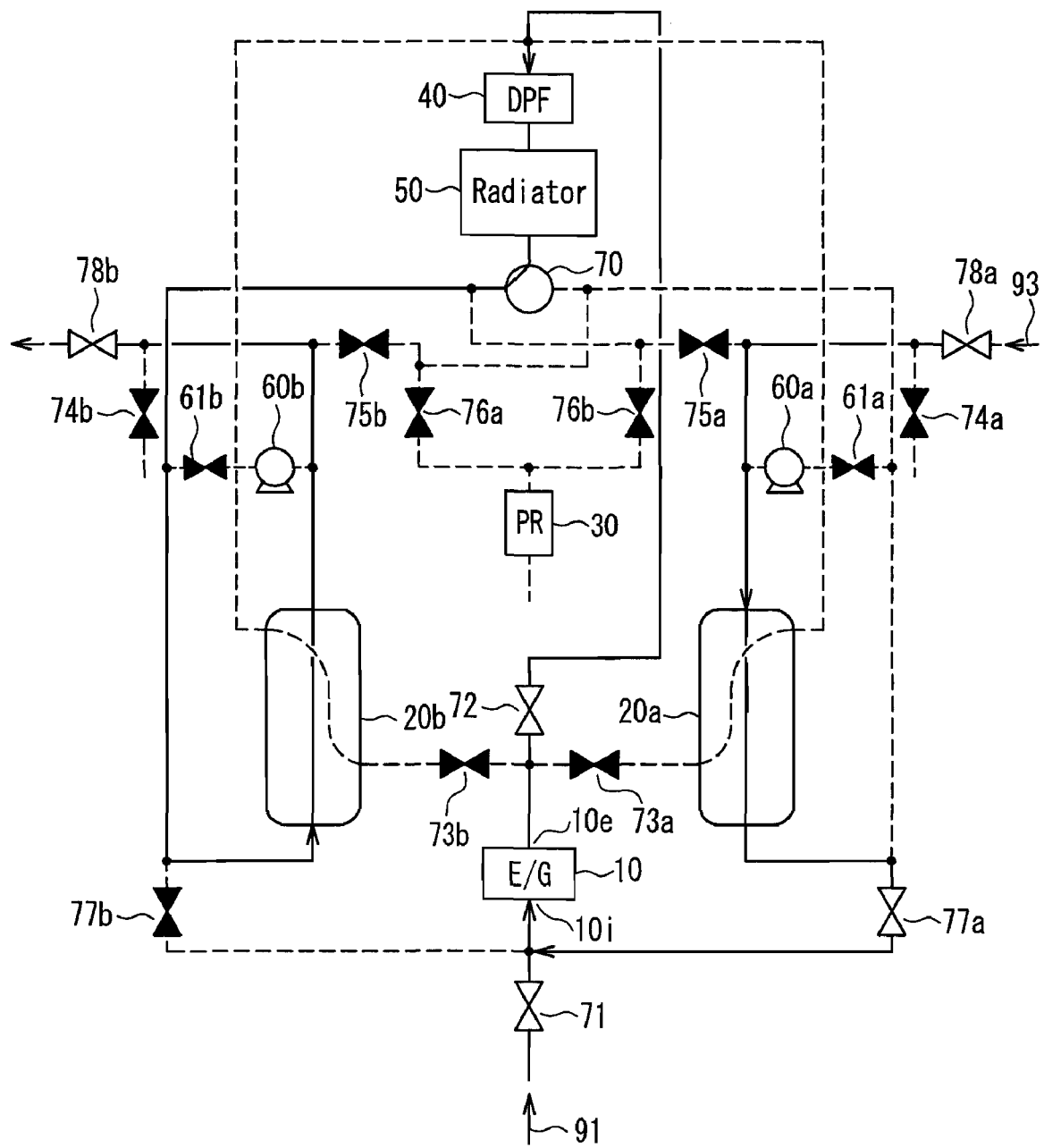
FIG. 4B is a diagram showing a gas flow in a cooling process using a first adsorption tower of an exhaust gas treating apparatus of Embodiment 3 of the present invention.
Figure 4C:
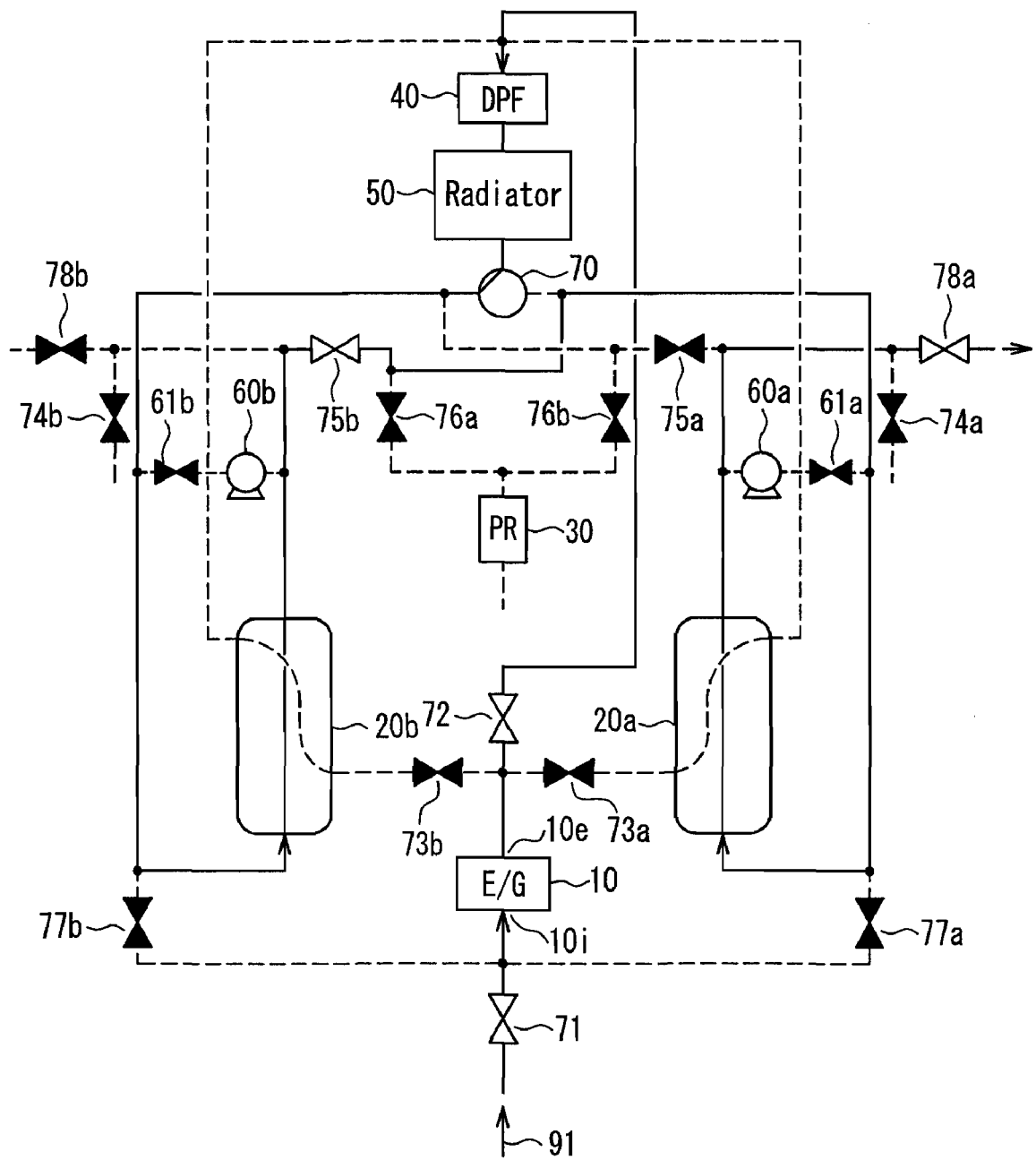
FIG. 4C is a diagram showing a gas flow in an adsorption process using a first adsorption tower of an exhaust gas treating apparatus of Embodiment 3 of the present invention.

The exhaust gas treating apparatus of this embodiment switches from one adsorption tower to another every time a set of three processes consisting of the desorption process, the cooling process, and the adsorption process is performed, and each adsorption tower performs the three processes. That is, one of the two adsorption towers (i.e., a first adsorption tower) is used to perform a set of the desorption process, the cooling process, and the adsorption process, and the other (i.e., a second adsorption tower) is used to perform the next set of the desorption process, the cooling process, and the adsorption process. Subsequently, this alternation is repeated. FIGS. 4A, 4B, and 4C are diagrams showing gas flows in the desorption process, the cooling process, and the adsorption process using the first adsorption tower of the exhaust gas treating apparatus of Embodiment 3 of the present invention, respectively. The meanings of symbols in FIGS. 4A to 4C are as shown in FIG. 2. In FIGS. 4A to 4C, the same members as those in FIGS. 1A to 1C and 3A to 3C are denoted by the same reference numerals, and their explanations will not be repeated. The members corresponding to either the first adsorption tower or the second adsorption tower are distinguished by adding a subscript "a" or "b" to the reference numerals of the same members as shown in FIGS. 1A to 1C and 3A to 3C. The gas flows in the desorption process, the cooling process, and the adsorption process using the second adsorption tower are symmetrical to those shown in FIGS. 4A, 4B, and 4C, and therefore the drawings are omitted.

In the desorption process using the first adsorption tower 20a, the target components adsorbed by the adsorbent of the first adsorption tower 20a are desorbed from the adsorbent, so that the adsorbent of the first adsorption tower 20a is recycled. The adsorbent that has adsorbed the target components is heated with the use of heat of the exhaust gas, thereby desorbing the target components. On the other hand, the second adsorption tower 20b adsorbs the target components in the exhaust gas from the engine 10. The gas flow in the desorption process will be described with reference to FIG. 4A. The engine 10 takes in air 91 through the valve 71 and emits an exhaust gas containing the target components including $NO_X$. The exhaust gas passes through the valve 73a and the heat transfer path of the first adsorption tower 20a. When the exhaust gas passes through the heat transfer path, the thermal energy of the exhaust gas is transferred to the adsorbent of the adsorption layer in the first adsorption tower 20a. Consequently, the adsorbent in the first adsorption tower 20a is heated, while the exhaust gas is cooled. The cooled exhaust gas enters the DPF 40 where particulate matters (e.g., soot) are removed from the exhaust gas. Then, the exhaust gas is cooled further by the radiator 50 and passes through the three-way valve 70 and the adsorption layer of the second adsorption tower 20b. The adsorption layer is filled with the adsorbent, and the adsorbent adsorbs the target components including $NO_X$ in the exhaust gas when the exhaust gas passes through gaps in the adsorbent. After the exhaust gas passes through the second adsorption tower 20b where the target components are adsorbed, it passes through a valve 78b and is released into the atmosphere. On the other hand, the desorption gas 92 passes through the valve 74a and the adsorption layer of the first adsorption tower 20a. Since the adsorbent in the adsorption layer of the first adsorption tower 20a has been heated by the exhaust gas, the target components adsorbed by the adsorbent are desorbed and conveyed together with the desorption gas to the outside of the first adsorption tower 20a. A part of the desorption gas containing the target components passes through the valve 61a and the blower 60a, and then re-enters the adsorption layer of the first adsorption tower 20a. The remainder passes through the valve 76a and enters the plasma reactor 30. In the plasma reactor 30, the desorption gas is subjected to a plasma treatment, and $NO_X$ (the target components) contained in the desorption gas is reduced to $N_2$. Subsequently, the desorption gas containing $N_2$ is released into the atmosphere.

In the cooling process using the first adsorption tower 20a, the adsorbent of the first adsorption tower 20a heated in the desorption process is cooled to a temperature at which the adsorbent can adsorb the target components. On the other hand, the second adsorption tower 20b adsorbs the target components in the exhaust gas from the engine 10. The gas flow in the cooling process will be described with reference to FIG. 4B. A large amount of air serving as the cooling gas 93 passes through a valve 78a and the adsorption layer of the first adsorption tower 20a. The adsorbent in the first adsorption tower 20a is cooled rapidly with the air passing through the adsorption layer. The air that has passed through the first adsorption tower 20a passes through the valve 77a and enters the inlet 10i of the engine 10. The engine 10 takes in both the air 91 through the valve 71 and the air through the first adsorption tower 20a and emits an exhaust gas containing the target components including $NO_X$. The exhaust gas passes through the valve 72 and enters the DPF 40 where particulate matters (e.g., soot) are removed from the exhaust gas. Then, the exhaust gas is cooled by the radiator 50 and passes through the three-way valve 70 and the adsorption layer of the second adsorption tower 20b. When the exhaust gas passes through the adsorption layer of the second adsorption tower 20b, the adsorbent in the adsorption layer adsorbs the target components including $NO_X$ in the exhaust gas. After the target components are adsorbed in the second adsorption tower 20b, the exhaust gas passes through the valve 78b and is released into the atmosphere.

In the adsorption process using the first adsorption tower 20a, the first adsorption tower 20a and the second adsorption tower 20b adsorb the target components including $NO_X$ in the exhaust gas emitted from the engine 10. The gas flow in the adsorption process will be described with reference to FIG. 4C. The engine 10 takes in air 91 through the valve 71 and emits an exhaust gas containing the target components including $NO_X$. The exhaust gas passes through the valve 72 and enters the DPF 40 where particulate matters (e.g., soot) are removed from the exhaust gas. Then, the exhaust gas is cooled by the radiator 50 and passes through the three-way valve 70 and the adsorption layer of the second adsorption tower 20b. When the exhaust gas passes through the adsorption layer of the second adsorption tower 20b, the adsorbent in the adsorption layer adsorbs the target components including $NO_X$ in the exhaust gas. The exhaust gas that has passed through the second adsorption tower 20b passes through the valve 75b and the adsorption layer of the first adsorption tower 20a. This adsorption layer also is filled with the adsorbent, and the adsorbent adsorbs the target components including $NO_X$ in the exhaust gas when the exhaust gas passes through gaps in the adsorbent. Thus, after the target components are adsorbed in the second adsorption tower 20b and the first adsorption tower 20a, the exhaust gas passes through the valve 78a and is released into the atmosphere.

Thereafter, a set of the desorption process, the cooling process, and the adsorption process is performed using the second adsorption tower 20b. The above explanation may be applied to the gas flows in the desorption process, the cooling process, and the adsorption process using the second adsorption tower 20b by replacing the subscripts "a" with "b" and vice versa of the reference numerals of the members shown in FIGS. 4A to 4C. The target components adsorbed by the adsorbent of the second adsorption tower 20b during the desorption process, the cooling process, and the adsorption process using the first adsorption tower 20a are desorbed in the desorption process using the second adsorption tower 20b, so that the adsorbent of the second adsorption tower 20b is recycled. Subsequently, the first adsorption tower 20a and the second adsorption tower 20b are switched alternately, and the desorption process, the cooling process, and the adsorption process are performed for each of the first and second adsorption towers 20a, 20b.

As described above, in this embodiment, the air that has passed through the adsorption layer of the adsorption tower in the cooling process is introduced into the inlet 10i of the engine 10, as in the case of Embodiment 1. The temperature of the adsorbent is still high at the beginning of the cooling process. Therefore, the air that has passed through the adsorption layer may contain $NO_X$ (the target components). In such a case, the intake air of the engine 10 contains $NO_X$. A part of $NO_X$ in the intake air is decomposed by the engine 10. Accordingly, the total amount of $NO_X$ emitted outside the system can be reduced, compared to the case where the air that has passed through the adsorption layer is not allowed to enter the inlet 10i of the engine 10. Moreover, the thermal energy of the exhaust gas is used to desorb the target components from the adsorbent and to recycle the adsorbent. In this regard, therefore, the amount of energy consumption can be reduced. Further, no wet process is included in the treatments of the target components, and thus conventional problems of maintenance and control of the treatment liquid do not arise.

Unlike Embodiment 1, in this embodiment, one of the two adsorption towers is used to perform the desorption process, the cooling process, and the adsorption process, while the other always adsorbs the target components contained in the exhaust gas. Therefore, compared to Embodiment 1, the total amount of the target components emitted outside the system can be reduced.

The above embodiment is merely an example, and the present invention is not limited thereto. Thus, various modifications can be made.

For example, in the desorption process (FIG. 4A) using the first adsorption tower 20a, the desorption gas that has passed through the plasma reactor 30 may be introduced into the adsorption layer of the second adsorption tower 20b instead of being released into the atmosphere. With this configuration, the adsorbent of the second adsorption tower 20b can adsorb $NO_X$ that is not reduced in the plasma reactor 30, so that the amount of $NO_X$ released into the atmosphere can be reduced. The same is true for the desorption process using the second adsorption tower 20b.

In the desorption process (FIG. 4A) using the first adsorption tower 20a, the desorption gas that has passed through the adsorption layer of the first adsorption tower 20a is subjected to the plasma treatment in the plasma reactor 30. However, the present invention is not limited thereto. For example, when the repeating unit consisting of the adsorption process, the desorption process, and the cooling process is repeated, some of the desorption processes may include the plasma treatment and others may include no plasma treatment. In particular, the amount of $NO_X$ contained in the desorption gas that has passed through the adsorption layer of the adsorption tower 20 can be relatively small immediately after the start of the operation. In such a case, the plasma treatment may be omitted. The same is true for the desorption process using the second adsorption tower 20b. Alternatively, no plasma treatment may be performed by removing the plasma reactor 30. The omission of the plasma treatment can reduce the energy required for this. The removal of the plasma reactor 30 further can reduce the size and cost of the apparatus.

In the desorption process (FIG. 4A) using the first adsorption tower 20a, a part of the desorption gas that has passed through the adsorption layer of the first adsorption tower 20a passes through the valve 61a and the blower 60a, and then re-enters the adsorption layer of the first adsorption tower 20a. This is because a limited amount of the desorption gas supplied through the valve 74a can be used to increase the flow rate of the desorption gas passing through the adsorption layer. Consequently, the time required for the desorption process can be made shorter. The amount (flow rate) of the desorption gas that re-enters the adsorption layer can be adjusted by changing the wind speed of the blower 60a. In the present invention, however, the desorption gas circulation path including the valve 61a and the blower 60a may be omitted. The same is true for the desorption process using the second adsorption tower 20b.

In the cooling process (FIG. 4B) using the first adsorption tower 20a, not only the air that has passed through the adsorption layer of the first adsorption tower 20a, but also the air that has passed through the valve 71 enters the engine 10. This configuration is intended to prevent the pressure loss of the induction system due to the engine 10 from being excessively large when the valve 71 is closed. However, the present invention is not limited thereto. In the cooling process, the valve 71 may be closed, and only the air that has passed through the adsorption layer of the first adsorption tower 20a may enter the engine 10. The same is true for the cooling process using the second adsorption tower 20b.

In the cooling process (FIG. 4B) using the first adsorption tower 20a, the air is used as the cooling gas 93 that is introduced into the adsorption layer of the first adsorption tower 20a. However, the present invention is not limited thereto. For example, at least a part of the purified exhaust gas that has been cooled by the radiator 50 and passed through the second adsorption tower 20b may be used. Thus, the cooled exhaust gas passes through the adsorption layer of the first adsorption tower 20a, and then enters the inlet 10i of the engine 10. Therefore, so-called exhaust gas recirculation is conducted to reduce the oxygen concentration in the intake air of the engine 10. Consequently, the combustion temperature is lowered, and the content of $NO_X$ in the exhaust gas can be reduced further. The same is true for the cooling process using the second adsorption tower 20b.

In the above embodiment, the adsorption towers are switched every time a set of the desorption process, the cooling process, and the adsorption process is performed in this order. However, the present invention is not limited thereto. For example, the adsorption towers may be switched every time a set of the adsorption process, the desorption process, and the cooling process is performed in this order.

The piping diagrams of FIGS. 4A to 4C are merely examples, and the present invention is not limited thereto. For example, the three-way valve may be replaced by a valve. On the contrary, the valves may be replaced by three-way valves. Moreover, the positions of the valves and the three-way valve may be changed. For example, the valves 73a, 73b may be moved to positions on the flow paths between the heat transfer paths of the adsorption towers 20a, 20b and the DPF 40, respectively. This configuration can reduce the degree of heat resistance required for the valves 73a, 73b.

The exhaust gas treating apparatus may have three or more adsorption towers.

Embodiment 4

An exhaust gas treating apparatus of Embodiment 4 of the present invention is the same as the exhaust gas treating apparatus of Embodiment 3 in the use of two adsorption towers. However, Embodiment 4 differs from Embodiment 3 in that the desorption process of Embodiment 4 is the same as that of Embodiment 2, and the desorption process of Embodiment 3 is the same as that of Embodiment 1.

Figure 5A:
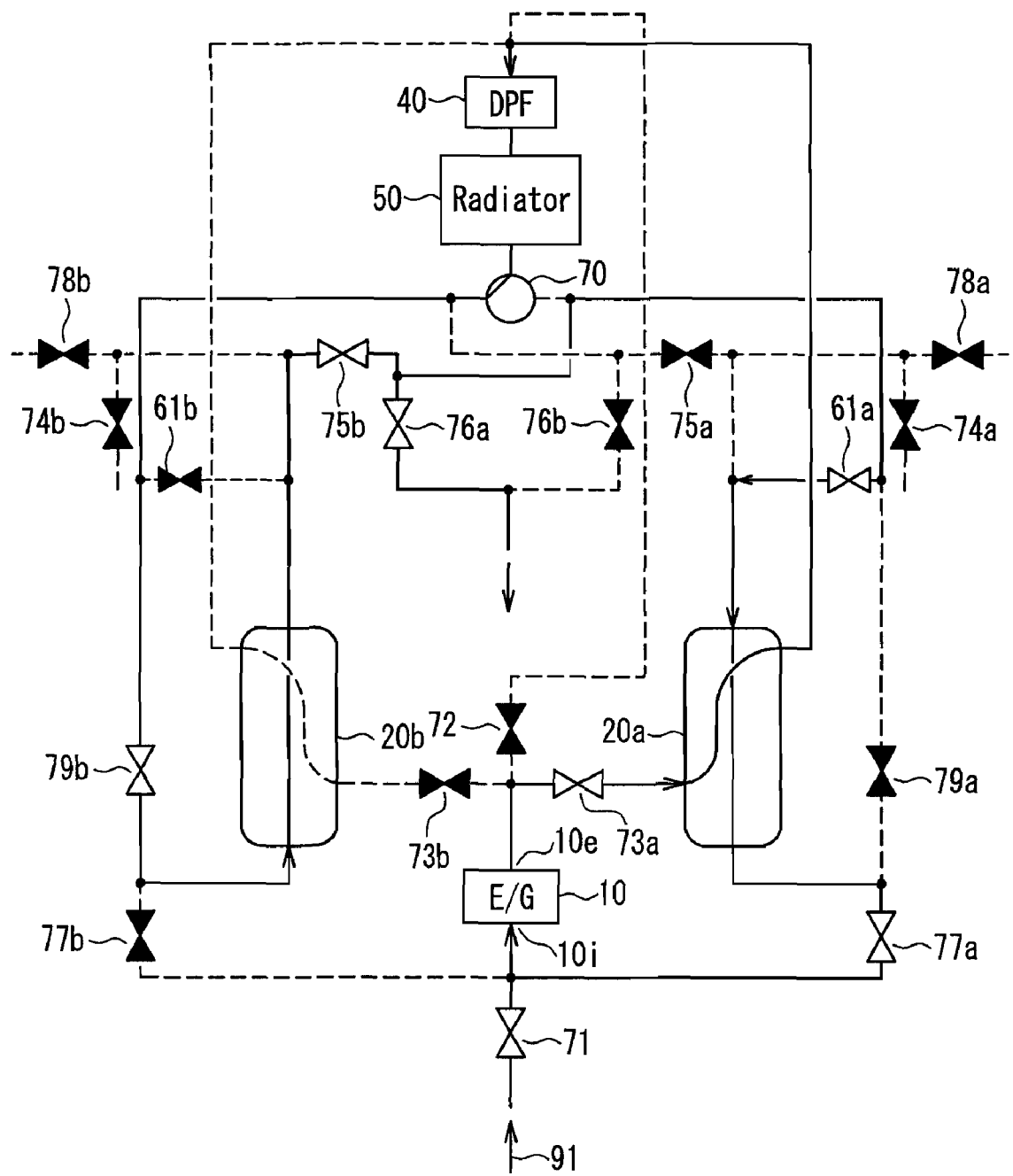
FIG. 5A is a diagram showing a gas flow in a desorption process using a first adsorption tower of an exhaust gas treating apparatus of Embodiment 4 of the present invention.
Figure 5B:
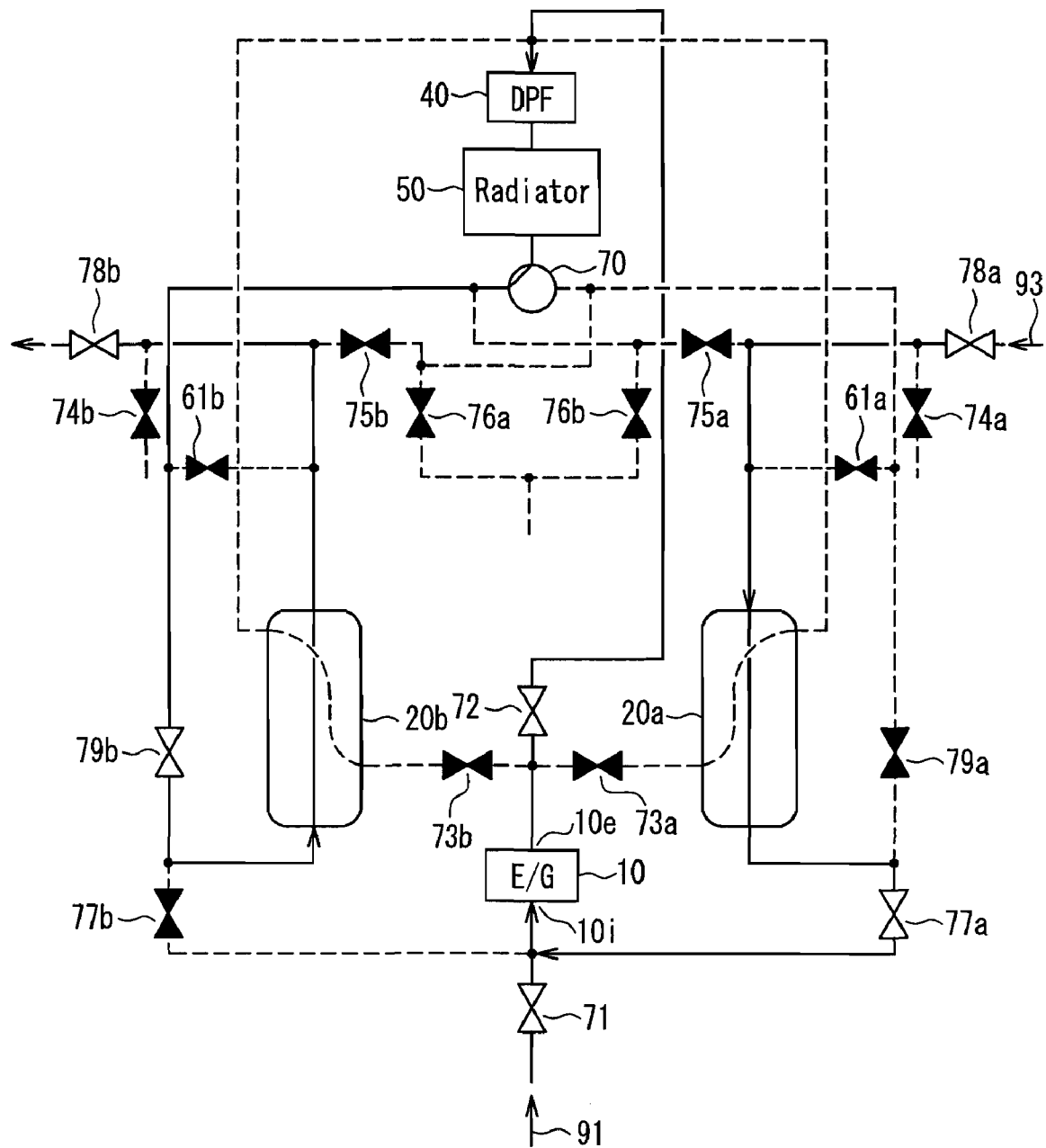
FIG. 5B is a diagram showing a gas flow in a cooling process using a first adsorption tower of an exhaust gas treating apparatus of Embodiment 4 of the present invention.
Figure 5C:
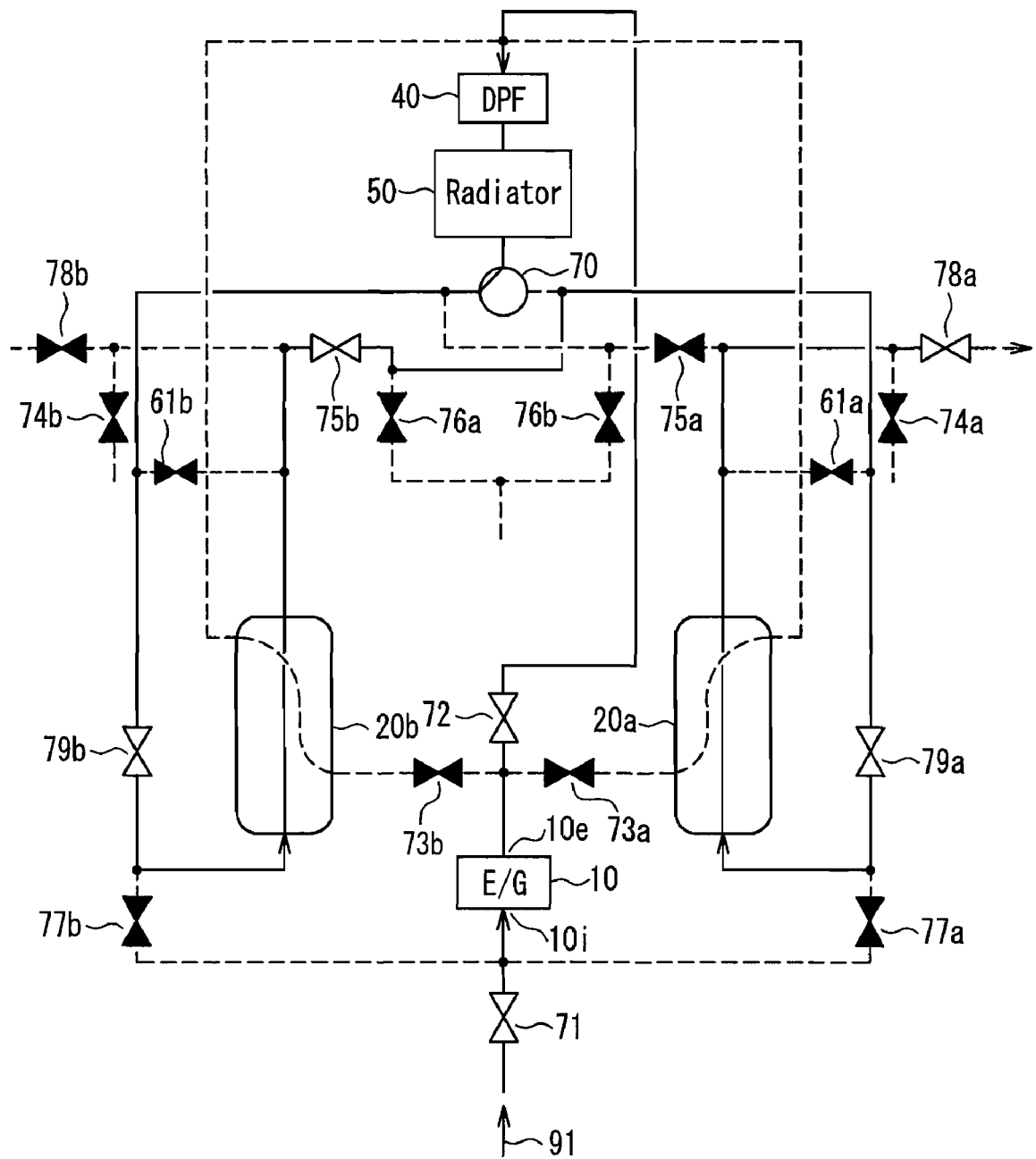
FIG. 5C is a diagram showing a gas flow in an adsorption process using a first adsorption tower of an exhaust gas treating apparatus of Embodiment 4 of the present invention.

Like Embodiment 3, the exhaust gas treating apparatus of Embodiment 4 switches from one adsorption tower to another every time a set of three processes consisting of the desorption process, the cooling process, and the adsorption process is performed, and each adsorption tower performs the three processes. FIGS. 5A, 5B, and 5C are diagrams showing gas flows in the desorption process, the cooling process, and the adsorption process using a first adsorption tower of the exhaust gas treating apparatus of Embodiment 4 of the present invention, respectively. The meanings of symbols in FIGS. 5A to 5C are as shown in FIG. 2. In FIGS. 5A to 5C, the same members as those in FIGS. 3A to 3C and 4A to 4C are denoted by the same reference numerals, and their explanations will not be repeated. The gas flows in the desorption process, the cooling process, and the adsorption process using a second adsorption tower are symmetrical to those shown in FIGS. 5A, 5B, and 5C, and therefore the drawings are omitted.

Embodiment 4 differs from Embodiment 3 in the following two points: the blowers 60a, 60b and the plasma reactor 30 are omitted; and valves 79a, 79b are provided on paths that connect the three-way valve 70 and the valves 77a, 77b and do not contain the valves 61a, 61b and the adsorption towers 20a, 20b, respectively.

In the desorption process (FIG. 5A) using the first adsorption tower 20a, the target components adsorbed by the adsorbent of the first adsorption tower 20a are desorbed from the adsorbent, so that the adsorbent of the first adsorption tower 20a is recycled. The adsorbent that has adsorbed the target components is heated with the use of heat of the exhaust gas, thereby desorbing the target components. On the other hand, the second adsorption tower 20b adsorbs the target components in the exhaust gas from the engine 10. The gas flow in the desorption process will be described. The engine 10 emits an exhaust gas containing the target components including $NO_X$ from the outlet 10e. The exhaust gas passes through the valve 73a and the heat transfer path of the first adsorption tower 20a. When the exhaust gas passes through the heat transfer path, the thermal energy of the exhaust gas is transferred to the adsorbent of the adsorption layer in the first adsorption tower 20a. Consequently, the adsorbent in the first adsorption tower 20a is heated, while the exhaust gas is cooled. The cooled exhaust gas enters the DPF 40 where particulate matters (e.g., soot) are removed from the exhaust gas. Then, the exhaust gas is cooled further by the radiator 50 and passes through the three-way valve 70, the valve 79b, and the adsorption layer of the second adsorption tower 20b. The adsorption layer is filled with the adsorbent, and the adsorbent adsorbs the target components including $NO_X$ in the exhaust gas when the exhaust gas passes through gaps in the adsorbent. After the exhaust gas passes through the second adsorption tower 20b where the target components are adsorbed, it passes through the valve 75b, and a part of the exhaust gas passes through the valve 76a and is released into the atmosphere. The remainder passes through the valve 61a and enters the adsorption layer of the first adsorption tower 20a. Since the adsorbent in the adsorption layer has been heated by the exhaust gas passing through the heat transfer path, the target components adsorbed by the adsorbent are desorbed and conveyed together with the exhaust gas to the outside of the first adsorption tower 20a. The exhaust gas containing the target components passes through the valve 77a and enters the inlet 10i of the engine 10. The engine 10 takes in both the air 91 through the valve 71 and the exhaust gas containing the target components through the adsorption tower 20.

In the cooling process (FIG. 5B) using the first adsorption tower 20a, the same treatment as that shown in FIG. 4B is performed. Therefore, a detailed explanation will not be repeated. In this case, the valve 79a may be either opened or closed. The valve 79b is opened.

In the desorption process (FIG. 5C) using the first adsorption tower 20a, the same treatment as shown in FIG. 4C is performed with the valves 79a, 79b open. Therefore, a detailed explanation will not be repeated.

The above explanation may be applied to the gas flows in the desorption process, the cooling process, and the adsorption process using the second adsorption tower 20b by replacing the subscripts "a" with "b" and vice versa of the reference numerals of the members.

Except for the above, Embodiment 4 is the same as Embodiment 3 and has similar effects to those of Embodiment 3. Moreover, since the desorption process of Embodiment 4 is the same as that of Embodiment 2, this embodiment also has similar effects to those of Embodiment 2.

As described in Embodiment 2, a gas other than the exhaust gas can be used as a desorption gas in the desorption process.

The various modified examples described in Embodiments 2, 3 also can be applied to Embodiment 4 without any revision or with an obvious revision. In such a case, Embodiment 4 has similar effects to those of Embodiments 2, 3.

(Adsorption Tower)

Figure 6A:
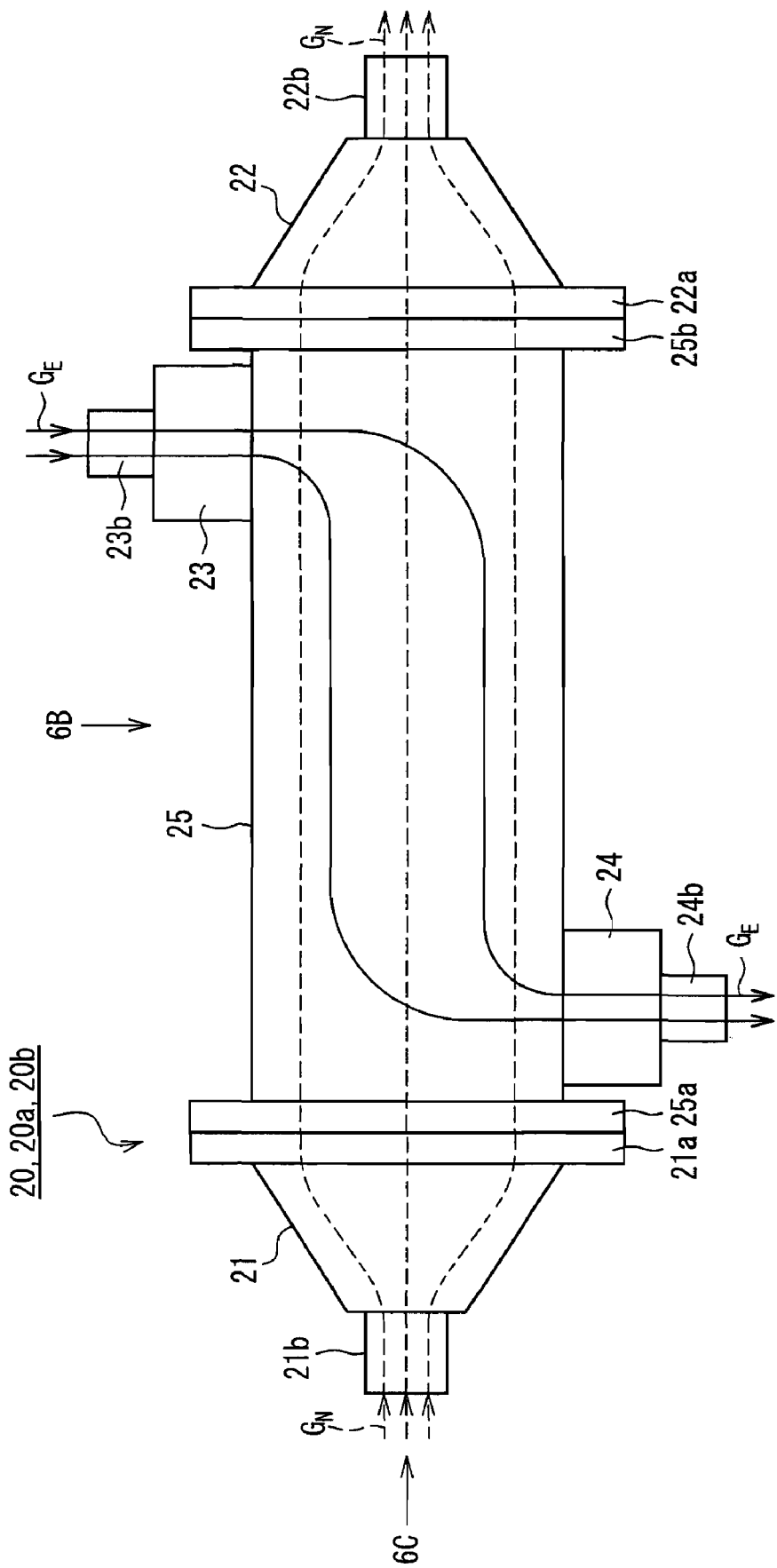
FIG. 6A is a side view of an adsorption tower of an embodiment used in an exhaust gas treating apparatus of the present invention.
Figure 6B:
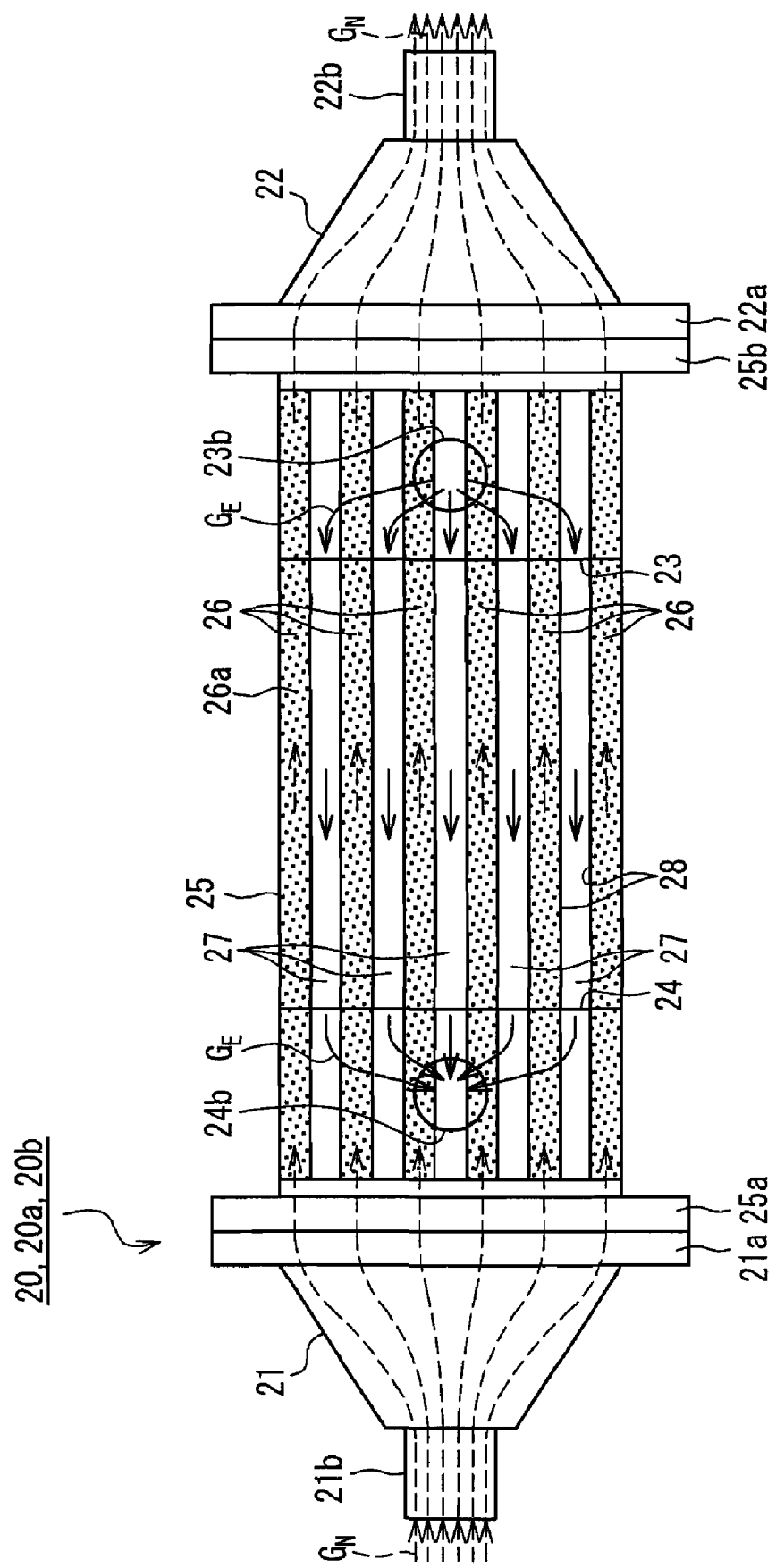
FIG. 6B is a perspective view of the adsorption tower when viewed from the direction of the arrow 6B in FIG. 6A.
Figure 6C:
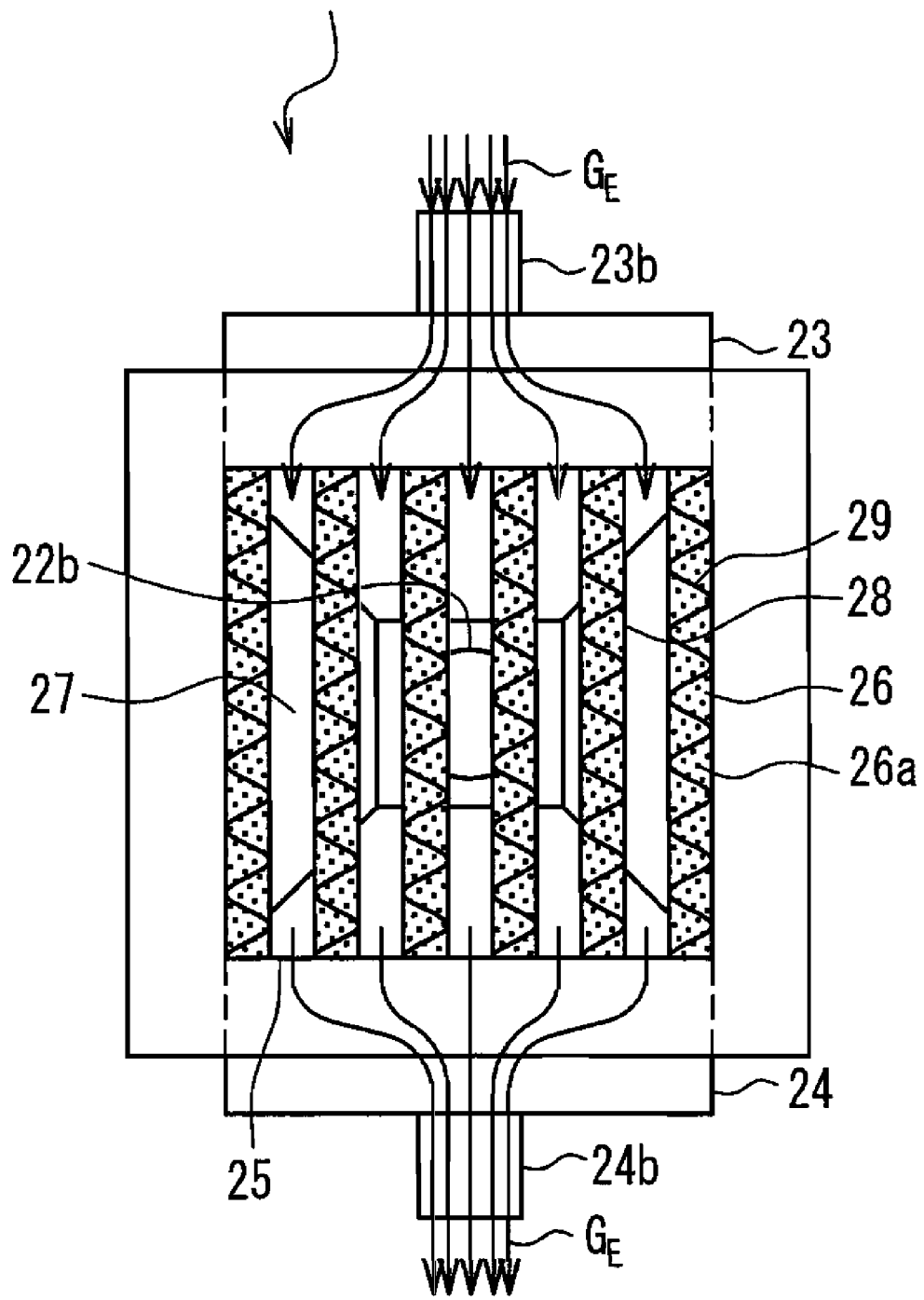
FIG. 6C is a perspective view of the adsorption tower when viewed from the direction of the arrow 6C in FIG. 6A.

An embodiment of the adsorption towers 20, 20a, and 20b used in the exhaust gas treating apparatuses of the present invention will be described. FIG. 6A is a side view of the adsorption towers 20, 20a, and 20b. FIG. 6B is a perspective view of the adsorption towers 20, 20a, and 20b when viewed from the direction of the arrow 6B in FIG. 6A. FIG. 6C is a perspective view of the adsorption towers 20, 20a, and 20b when viewed from the direction of the arrow 6C in FIG. 6A.

The adsorption towers 20, 20a, and 20b include first and second ducts 21, 22 in the form of a substantially square pyramid and a main body 25 in the form of a hollow square prism. A flange 25a at one end of the main body 25 is connected to a flange 21a of the first duct 21, and a flange 25b at the other end of the main body 25 is connected to a flange 22a of the second duct 22, thereby integrating the main body 25 with the first and second ducts 21, 22 that sandwich the main body 25. The first and second ducts 21, 22 have first and second connection ports 21b, 22b that are connected to the piping of the exhaust gas treating apparatus, respectively.

Third and fourth ducts 23, 24 are formed at diagonal positions near the ends of the main body 25. The third and fourth ducts 23, 24 have third and fourth connection ports 23b, 24b that are connected to the piping of the exhaust gas treating apparatus, respectively.

In the main body 25, a plurality of adsorption layers 26 filled with an adsorbent 26a and a plurality of heat transfer paths 27 are arranged alternately. The plurality of adsorption layers 26 are connected to the first and second connection ports 21b, 22b via the first and second ducts 21, 22. The plurality of heat transfer paths 27 are connected to the third and fourth connection ports 23b, 24b via the third and fourth ducts 23, 24. Metal meshes (not shown) are interposed between the flanges 25a, 21a and between the flanges 25b, 22a so as to prevent the adsorbent 26a from spilling out of the adsorption layers 26.

In FIGS. 6A to 6C, the solid lines indicate the flows of a high-temperature exhaust gas $G_E$ for heating the adsorbent 26a in the adsorption layers 26 in the desorption process, and the dashed lines indicate the flows of a desorption gas $G_N$ for conveying the target components desorbed from the adsorbent 26a in the desorption process to the outside of the adsorption towers 20, 20a, and 20b. The high-temperature exhaust gas $G_E$ enters from the third connection port 23b and is divided into a plurality of streams in the third duct 23. The streams flow in the plurality of heat transfer paths 27 in the main body 25 and are combined into a stream in the fourth duct 24. Then, this stream exits from the fourth connection port 24b. On the other hand, the desorption gas $G_N$ enters from the first connection port 21b and is divided into a plurality of streams in the first duct 21. The streams flow in the plurality of adsorption layers 26 in the main body 25 and are combined into a stream in the second duct 22. Then, this stream exits from the second connection port 22b. Since the adsorbent 26a is heated by the high-temperature exhaust gas $G_E$, the target components including $NO_X$ adsorbed by the adsorbent 26a are desorbed. The desorbed target components are conveyed together with the desorption gas $G_N$ to the outside of the adsorption towers 20, 20a, and 20b. The exhaust gas $G_E$ and the desorption gas $G_N$ are separated by diaphragms 28 between each of the adsorption layers 26 and the heat transfer paths 27 and will not be mixed. To facilitate the heat transfer from the heat transfer paths 27 to the adsorbent 26a in the adsorption layers 26, corrugated heat-transfer fins 29 are provided in the individual adsorption layers 26 so that each of the heat-transfer fins 29 is in contact with the diaphragms 28 on both sides of the adsorption layer 26. The heat-transfer fins 29 are embedded in the adsorbent 26a.

In the adsorption process, the exhaust gas flows in the opposite direction to the desorption gas $G_N$ in the desorption process. That is, the exhaust gas enters from the second connection port 22b, flows in the plurality of adsorption layers 26 in the main body 25, and exits from the first connection port 21b. In this case, no gas flows in the heat transfer paths 27.

In the cooling process, the cooling gas flows in the same direction as the desorption gas $G_N$ in the desorption process. That is, the cooling gas enters from the first connection port 21b, flows in the plurality of adsorption layers 26 in the main body 25, and exits from the second connection port 22b. In this case, no gas flows in the heat transfer paths 27.

As described above, it is preferable that both the exhaust gas in the adsorption process and the exhaust gas $G_E$ in the desorption process flow in the same direction (i.e., from the flange 25b to the flange 25a) in the main body 25. Moreover, in the desorption process, it is preferable that the exhaust gas $G_E$ and the desorption gas $G_N$ are counter flows in the main body 25, as shown in FIGS. 6A and 6B. The reason for this is as follows. In the adsorption process, the target components including $NO_X$ in the exhaust gas are more likely to be adsorbed as they are closer to the upstream side (the flange 25b side) in the main body 25. Therefore, in the desorption process, when the exhaust gas $G_E$ for heating flows in the same direction as the exhaust gas in the adsorption process, the temperature of the adsorption layers 26 can be higher on the side (the flange 25b side) where more target components had been adsorbed. Thus, the target components can be desorbed efficiently by the effective use of thermal energy. On the other hand, in the desorption process, if the desorption gas $G_N$ flows in the same direction as the exhaust gas $G_E$ for heating (i.e., from the flange 25b to the flange 25a), the target components desorbed from the adsorbent on the upstream side (the flange 25b side) where more target components had been adsorbed are likely to be readsorbed by the adsorbent on the downstream side. This is because the adsorption power of the adsorbent for the target components is inversely proportional to the amount of adsorption of the target components, and the amount of adsorption of the target components is smaller on the downstream side in the adsorption process. Therefore, it is preferable that the exhaust gas and the desorption gas in the adsorption process and the desorption process flow in the above directions. However, depending on the sizes, configurations, and arrangement positions of the adsorption towers 20, 20a, and 20b, the gases may flow in directions other than those described above.

The adsorbent 26a is not particularly limited, and known materials capable of adsorbing and desorbing the target components including $NO_X$ may be selected and used appropriately. For example, the adsorbent 26a can be Mn—Cu composite oxide pellets supporting 1 wt % of potassium ruthenate, a molecular sieve 13X, or the like.

The configurations of the adsorption towers 20, 20a, and 20b shown in FIGS. 6A to 6C are merely examples, and the present invention is not limited thereto and can be modified appropriately.

For example, the heat transfer path may be one or more than one metallic conduit buried in the adsorption layer instead of alternately arranging the adsorption layers and the heat transfer paths. When the heat transfer path is buried in the adsorption layer, it is preferable that a flat conduit is used as the heat transfer path to increase the heating surface area. The flat conduit can be produced by compressing a cylindrical metallic conduit with a suitable diameter or by bonding two metal strips together with their concave surfaces facing each other.

In general, the adsorption ability of the adsorbent for $NO_X$ is improved as the humidity becomes lower. Therefore, a dehumidifying agent may be mixed with the adsorbent or arranged upstream of the adsorbent in the direction of the flow of the exhaust gas in the adsorption process. The dehumidifying agent is not particularly limited and can be, e.g., silica gel, molecular sieve 5A, 3A, or 13X, or the like.

(Plasma Reactor)

An embodiment of the plasma reactor 30 used in the exhaust gas treating apparatus of the present invention will be described.

Figure 7A:
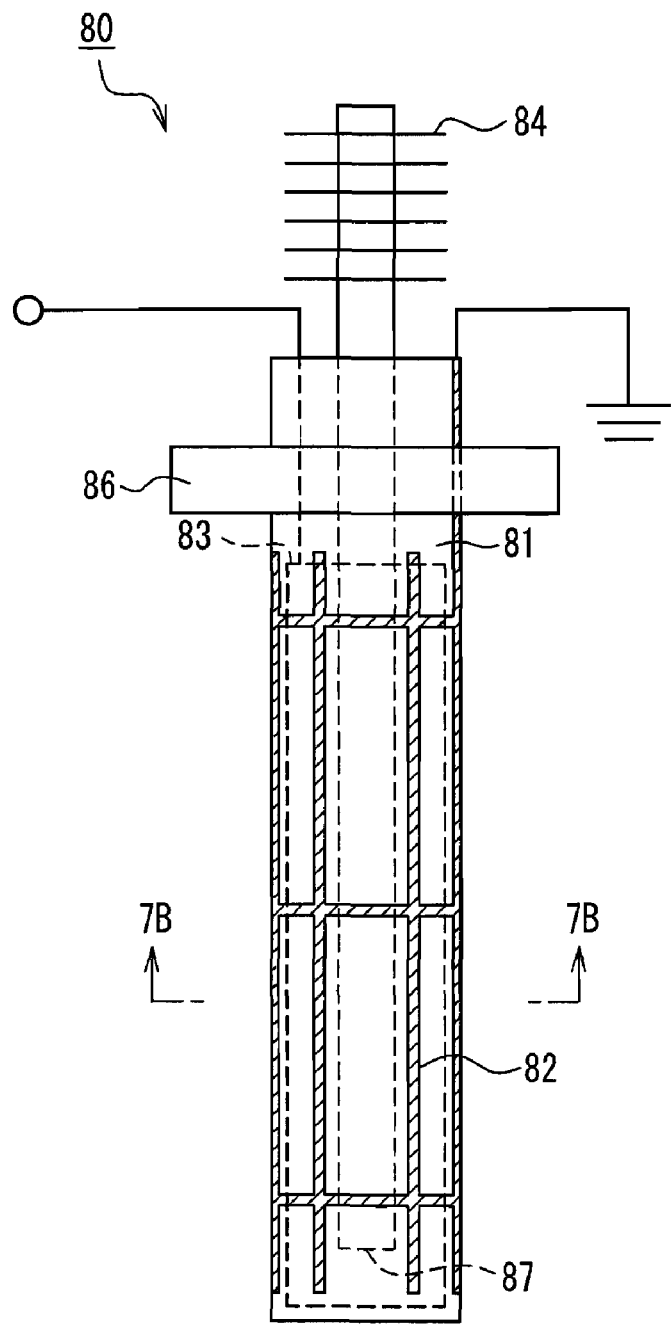
FIG. 7A is a side view of a surface discharge element used in a plasma reactor.
Figure 7B:
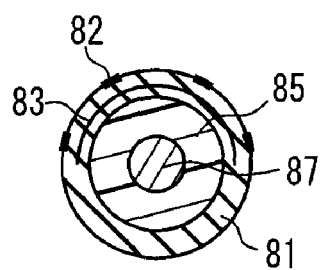
FIG. 7B is a cross-sectional view taken along the line 7B-7B in FIG. 7A.
Figure 8A:
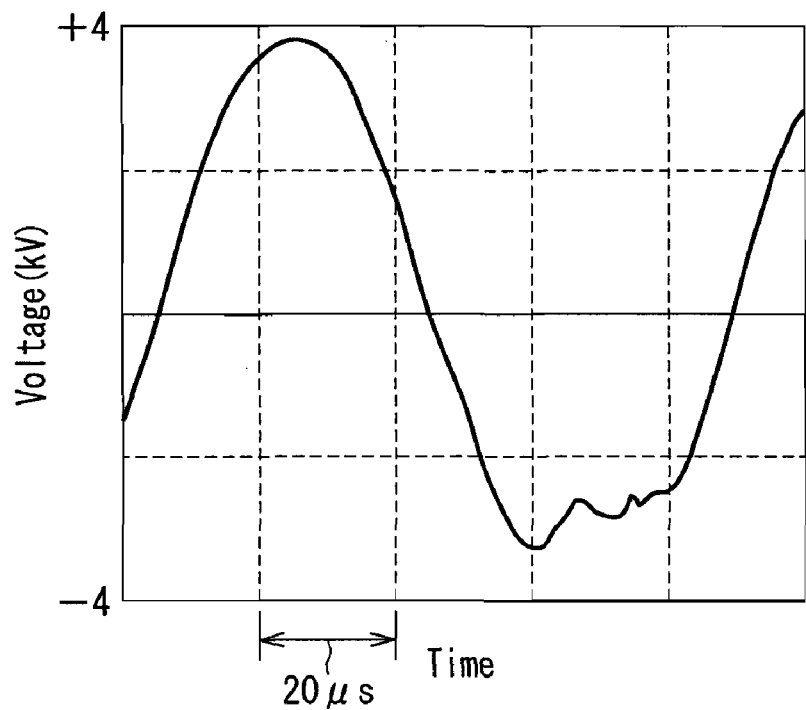
FIG. 8A shows an example of a voltage waveform applied to a buried electrode of a surface discharge element.
Figure 8B:
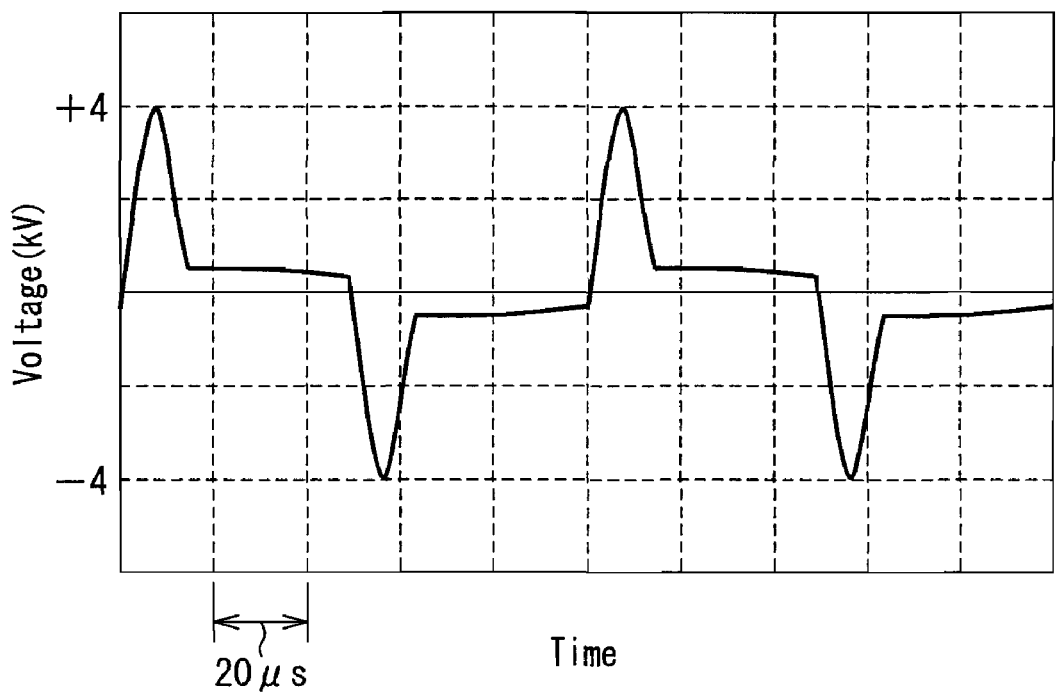
FIG. 8B shows another example of a voltage waveform applied to a buried electrode of a surface discharge element.

FIG. 7A is a side view of a surface discharge element 80 used in the plasma reactor 30. FIG. 7B is a cross-sectional view taken along the line 7B-7B in FIG. 7A. Sintered metal discharge electrodes 82 for generating plasma are formed in a predetermined pattern on the outer circumferential surface of a hollow cylindrical outer casing 81 made of ceramics. One end of the outer casing 81 is closed. The region where the discharge electrodes 82 are formed accounts for almost one-half the circumference of the outer casing 81. A buried electrode 83 is buried in the outer wall of the outer casing 81 so as to face the discharge electrodes 82. For example, when the discharge electrodes 82 are grounded (i.e., the electric potential is 0) and an alternating voltage is applied to the buried electrode 83, plasma is generated along the outer circumferential surface of the outer casing 81. The alternating voltage can be, e.g., an alternating voltage of about 12.5 kHz and 3.8 kV, as shown in FIG. 8A. Alternatively, the alternating voltage may be a pulse voltage, as shown in FIG. 8B. The discharged energy of a single surface discharge element 80 is, e.g., about 12 W. A copper rod 87 is inserted in the outer casing 81, and a radiator (radiation fin) 84 for heat dissipation is provided at one end of the copper rod 87 that is exposed to the outside of the outer casing 81. A heat conductive paste 85 is filled into a space between the outer casing 81 and the copper rod 87. This can prevent the contact points of the electrodes from being melted by heating. A flange 86 is formed in the vicinity of the edge of the opening of the outer casing 81 and used for installation of the surface discharge element 80. As the surface discharge element 80, OC-002 manufactured by Masuda Research Inc. can be used.

Figure 9A:
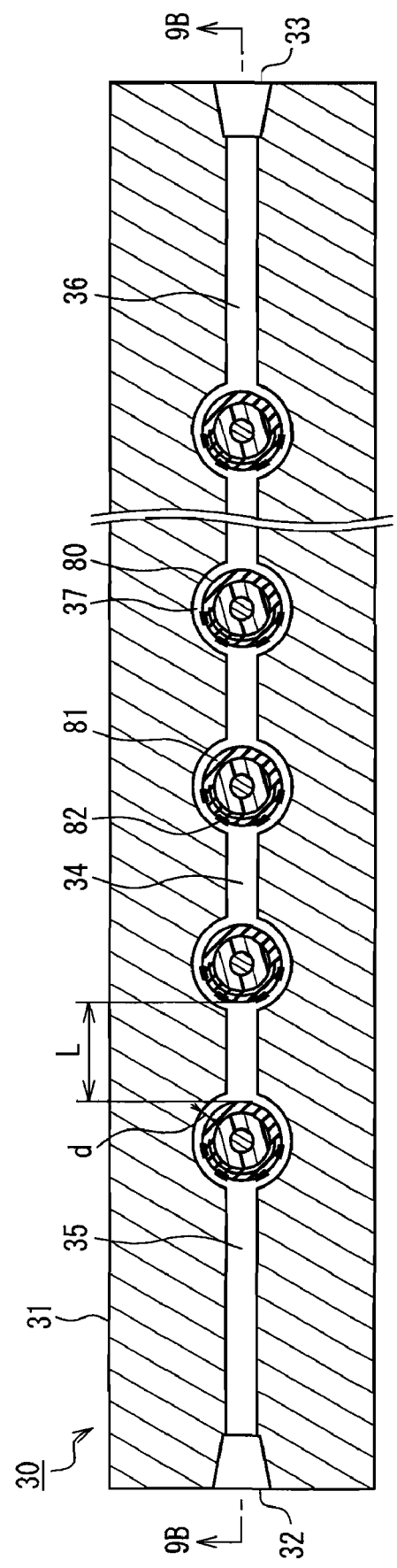
FIG. 9A is a cross-sectional side view of a plasma reactor of an embodiment used in an exhaust gas treating apparatus of the present invention.
Figure 9B:
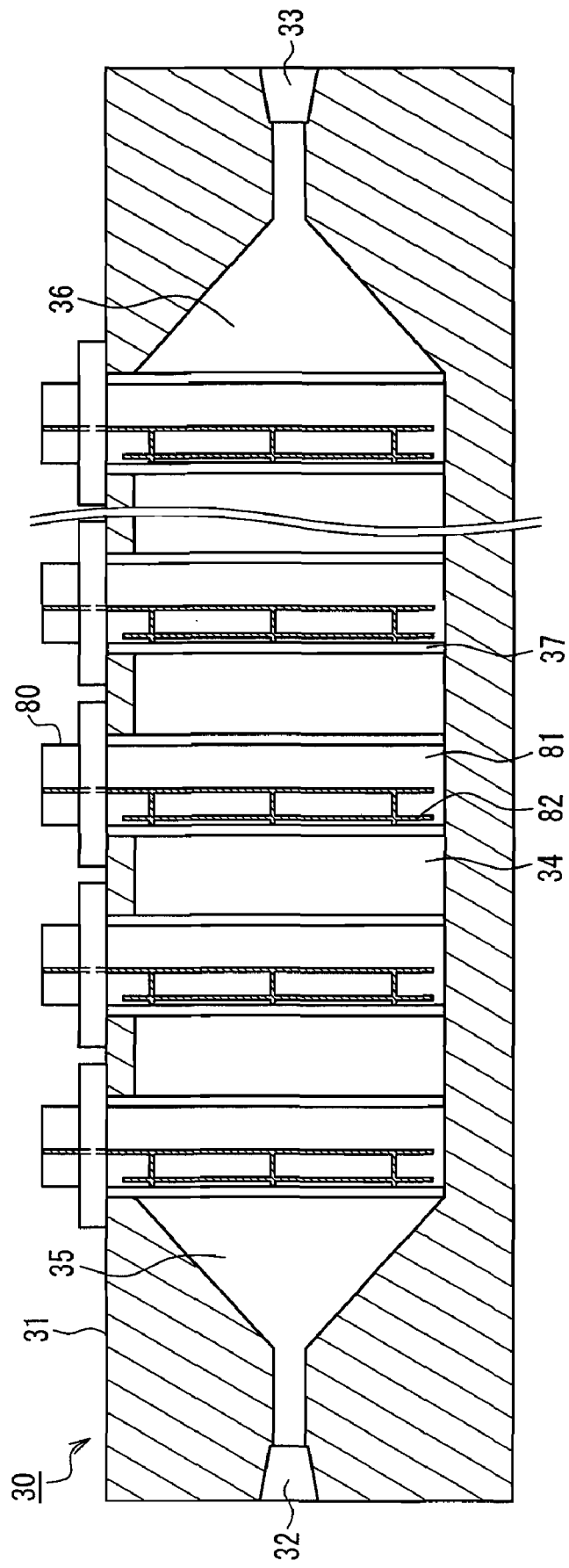
FIG. 9B is a cross-sectional view taken along the line 9B-9B in FIG. 9A.

FIG. 9A is a cross-sectional side view of the plasma reactor 30. FIG. 9B is a cross-sectional view taken along the line 9B-9B in FIG. 9A. The plasma reactor 30 includes a plurality of surface discharge elements 80 and a main body 31 for housing the plurality of surface discharge elements 80. The main body 31 is produced by machining of aluminum. The main body 31 has a first connection port 32 at one end in the longitudinal direction, a second connection port 33 at the other end in the longitudinal direction, a gas flow path 34 between the first connection port 32 and the second connection port 33, and first and second gas diffusion portions 35, 36 for changing the width of the gas flow path. The first and second gas diffusion portions 35, 36 are provided between the gas flow path 34 and the first connection port 32 and between the gas flow path 34 and the second connection port 33, respectively. A plurality of element accommodating portions 37, each of which has a cylindrical surface for receiving the outer casing 81 of the surface discharge element 80, are formed in the gas flow path 34. The surface discharge elements 80 are installed so that the discharge electrodes 82 formed on their respective outer casings 81 face the first connection port 32.

In the desorption process, the desorption gas containing the target components including $NO_X$ enters the first connection port 32 and is diffused in the longitudinal direction of the surface discharge element 80 in the first gas diffusion portion 35. Then, the diffused desorption gas enters the gas flow path 34, flows near the outer circumferential surface of the surface discharge element 80 in each of the element accommodating portions 37, is converged in the second gas diffusion portion 36, and exits from the second connection port 33. At this time, $NO_X$ contained in the desorption gas is reduced to $N_2$ with plasma generated by the surface discharge elements 80. It is preferable that a space d between the outer circumferential surface of the outer casing 81 of the surface discharge element 80 and the inner circumferential surface of the element accommodating portion 37 is set to about 1 mm. The experiments have confirmed that such a configuration maximizes the amount of the gas flowing through the plasma generation region and achieves high $NO_X$ reduction performance. A distance L between the adjacent surface discharge elements 80 is not particularly limited as long as it is not less than 0.

In the present invention, the configuration of the plasma reactor 30 is not limited to the above, and various modifications can be made.

For example, a plurality of the plasma reactors 30 shown in FIGS. 9A and 9B may be connected in series or in parallel.

The desorption gas may enter the second connection port 33 and exit from the first connection port 32.

The discharge electrodes 82 of the surface discharge element 80 may be formed around the entire circumference of the outer casing 81.

Figure 10A:
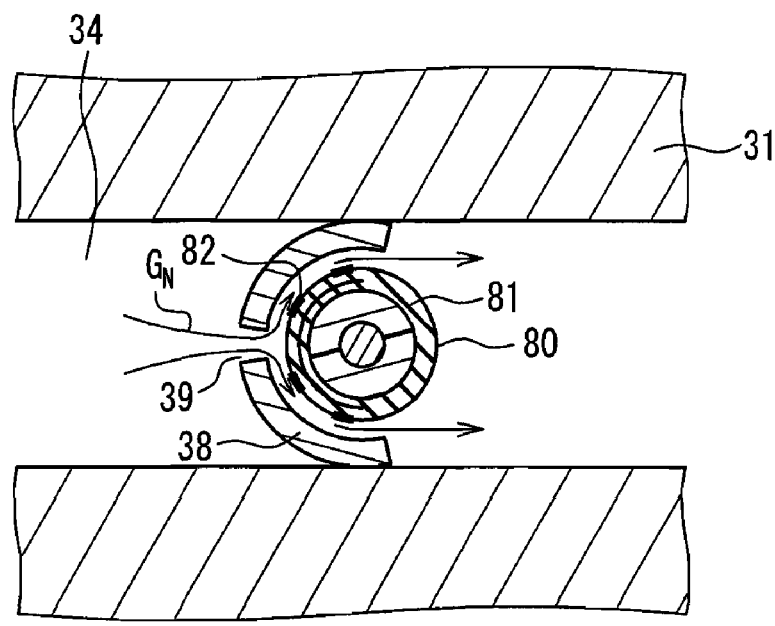
FIG. 10A is a partially enlarged cross-sectional side view of a plasma reactor of another embodiment used in an exhaust gas treating apparatus of the present invention.
Figure 10B:
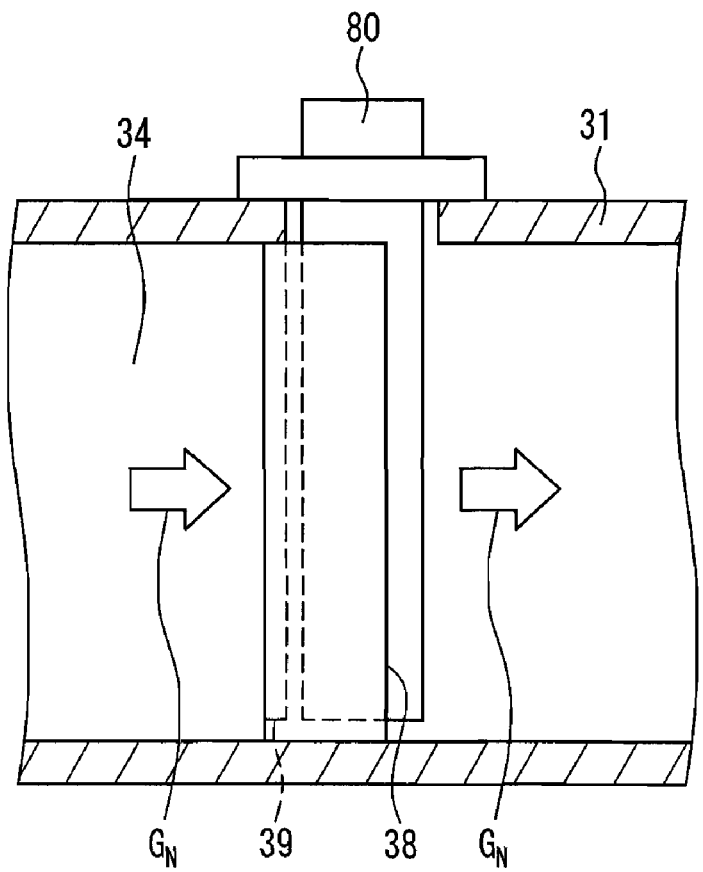
FIG. 10B is a partially enlarged cross-sectional plan view of the plasma reactor shown in FIG. 10A.

In the plasma reactor 30 shown in FIGS. 9A and 9B, the element accommodating portions 37 are formed in the gas flow path 34 of the main body 31 by machining and have a gas flow control shape for controlling the flow path of the desorption gas so that the desorption gas flows along the surface of the surface discharge element 80 on which surface discharge is generated (i.e., the outer circumferential surface of the outer casing 81). However, the present invention is not limited thereto. For example, as shown in FIGS. 10A and 10B, a gas flow path control member 38 may be provided separately from the main body 31. The gas flow path control member 38 is semi-cylindrical in shape, and a slit 39 that is parallel to the longitudinal direction of the surface discharge element 80 is formed in the central portion in the circumferential direction. The inner circumferential surface of the gas flow path control member 38 is a cylindrical surface that is spaced at a substantially fixed distance from the outer circumferential surface of the outer casing 81 of the surface discharge element 80. This cylindrical surface defines a gas flow control shape for controlling the flow path of the desorption gas $G_N$ so that the desorption gas $G_N$ flows along the outer circumferential surface of the outer casing 81 of the surface discharge element 80. The gas flow path control member 38 is arranged upstream of the surface discharge element 80 in the direction of the flow of the desorption gas $G_N$ and placed in the gas flow path 34 having a constant thickness. The surface discharge element 80 is installed so that the discharge electrodes 82 formed on the outer casing 81 face the slit 39. The desorption gas $G_N$ containing the target components including $NO_X$ passes through the slit 39 of the gas flow path control member 38 and flows near the outer circumferential surface of the surface discharge element 80.

In FIGS. 10A and 10B, the gas flow path control member 38 may be cylindrical, instead of semi-cylindrical, in shape so as to surround the periphery of the surface discharge element 80, and a pair of slits may be formed symmetrically with respect to the central axis. In this case, the desorption gas $G_N$ enters the gas flow path control member through one of the slits, flows near the outer circumferential surface of the surface discharge element 80, and exits from the other slit.

(Desorption Gas)

In the desorption process, the desorption gas introduced into the adsorption layer of the adsorption tower is not particularly limited and can be, e.g., air. However, when a plasma treatment is performed in the desorption process, the desorption gas preferably is a low oxygen gas with an oxygen concentration of 10 vol % or less. Examples of the low oxygen gas include a nitrogen gas with a purity of 99.99 vol % and a nitrogen gas mixed with an oxygen gas at an oxygen concentration of 10 vol % or less. The present inventors conducted experiments to measure a survival rate of $NO_X$ in the desorption gas after the plasma treatment by using a nitrogen gas with variously different oxygen concentrations as the desorption gas. Consequently, the experiments confirmed that although the survival rate of $NO_X$ was almost 0% at an oxygen concentration of 0 vol % (i.e., the removal rate of $NO_X$ was almost 100%), the survival rate was increased with increasing the oxygen concentration, and the ratio of the conversion of $NO_X$ to $NO_2$, $HNO_3$, $N_2O_5$, $N_2O$, etc. by the plasma treatment was increased as the oxygen concentration became higher. In particular, when the oxygen concentration was more than 10 vol %, most of NO was converted to $NO_2$ etc. by the plasma treatment, so that the exhaust gas treatment was insufficient.

As described in the desorption process (FIG. 3B) of Embodiment 2 and the desorption process (FIG. 5A) of Embodiment 4, the exhaust gas from the engine also can be used as the low oxygen gas with an oxygen concentration of 10 vol % or less, instead of a high purity nitrogen gas or a high concentration nitrogen gas that is particularly prepared. This eliminates the need for separately preparing, e.g., a high purity nitrogen gas as the low oxygen gas with an oxygen concentration of 10 vol % or less. Therefore, a gas cylinder or the like is not required, and the size of the apparatus can be reduced. Moreover, the operation cost can be reduced. Depending on the specification or operating conditions of the engine 10, the exhaust gas from the engine 10 may be used directly as the low oxygen gas with an oxygen concentration of 10 vol % or less. However, known techniques may be used as needed to obtain a desired low oxygen concentration exhaust gas with an oxygen concentration of 10 vol % or less. For example, the timing of fuel injection into the combustion cylinder of the engine 10 can be controlled properly, thereby reducing the oxygen concentration in the exhaust gas.

As described in the desorption process (FIG. 3B) of Embodiment 2 and the desorption process (FIG. 5A) of Embodiment 4, in the desorption process, the desorption gas containing $NO_X$ (the target components) that has passed through the adsorption layer may be introduced into the inlet 10$i$ of the engine 10. Thus, a part of $NO_X$ can be decomposed by the engine 10. When the engine 10 is used to decompose $NO_X$, the desorption gas does not need to be the low oxygen gas with an oxygen concentration of 10 vol % or less and can be, e.g., air. This eliminates the need for particularly preparing the low oxygen gas, so that a gas cylinder or the like is not required. In such a case, when the exhaust gas from the engine 10 is used as the desorption gas to be introduced into the adsorption layer of the adsorption tower 20, so-called exhaust gas recirculation is conducted, the combustion temperature is lowered, and thus the content of $NO_X$ in the exhaust can be reduced further.

EXAMPLES

Example 1

The following is an example in which $NO_X$ in an exhaust gas emitted from a diesel engine was treated using the exhaust gas treating apparatus for performing the operations of FIGS. 1A to 1C, as described in Embodiment 1.

A diesel engine (YDG200VS manufactured by YANMAR Co., Ltd.) with a displacement of $2 \times 10^{-4}$ m$^3$ (200 cc) was used as the engine 10. The desorption tower 20 shown in FIGS. 6A to 6C was used, in which nine layers of the heat transfer paths 27 and ten layers of the adsorption layers 26 were arranged alternately next to each other. Each of the adsorption layers 26 was provided with the corrugated heat-transfer fin 29 and filled with adsorbent pellets having a bulk volume of $3 \times 10^{-3}$ m$^3$ (3 L). As the adsorbent 26$a$, Mn—Cu composite oxide pellets supporting 1 wt % of potassium ruthenate were prepared. The plasma reactor 30 having the structure shown in FIGS. 9A and 9B was used, in which twelve surface discharge elements 80 were arranged on a plane. As the surface discharge element 80, OC-002 manufactured by Masuda Research Inc. was used. A pulse high voltage shown in FIG. 8B was applied to the twelve parallel-connected surface discharge elements 80 so that the total discharged energy was 120 W.

A 60 minutes adsorption process (FIG. 1A), a 20 minutes desorption process (FIG. 1B), and a 20 minutes cooling process (FIG. 1C) were repeated as a repeating unit. In the adsorption process, the flow rate of the exhaust gas emitted from the engine 10 was $300 \times 10^{-3}$ Nm$^3$/min. In the desorption process, a nitrogen gas with a purity of 99.99 vol % was introduced as a desorption gas from the valve 74 at a flow rate of $5.2 \times 10^{-3}$ Nm$^3$/min, and a part of the desorption gas that passed through the adsorption layer of the adsorption tower 20 was allowed to re-enter the adsorption layer at a flow rate of $35 \times 10^{-3}$ Nm$^3$/min using the blower 60. In the cooling process, air was introduced as a cooling gas from the valve 75 at a flow rate of $150 \times 10^{-3}$ Nm$^3$/min. In this example, the unit "Nm$^3$/min" indicates a volume flow rate under the standard conditions (0° C., atmospheric pressure). The load of the engine 10 was 1 kW. The plasma reactor 30 was operated in some of the desorption processes, but not operated in others.

In the adsorption process, as shown in FIG. 1A, the concentration (ppm) of $NO_X$ in the gas was measured at a point A in the flow path between the outlet 10e of the engine 10 and the DPF 40 and a point B in the flow path that was downstream of the adsorption tower 20.

In the desorption process, as shown in FIG. 1B, the concentration (ppm) of $NO_X$ in the gas was measured at a point C in the flow path that was downstream of the plasma reactor 30.

In the cooling process, as shown in FIG. 1C, the concentration (ppm) of $NO_X$ in the gas was measured at the point A in the flow path between the outlet 10e of the engine 10 and the DPF 40 and a point D in the flow path between the adsorption tower 20 and the inlet 10i of the engine 10.

A portable gas analyzer PG-235 manufactured by HORIBA, Ltd. was used to measure the $NO_X$ concentration at each point. A mass flow rate of $NO_X$ was determined from the measured $NO_X$ concentration.

Figure 11:
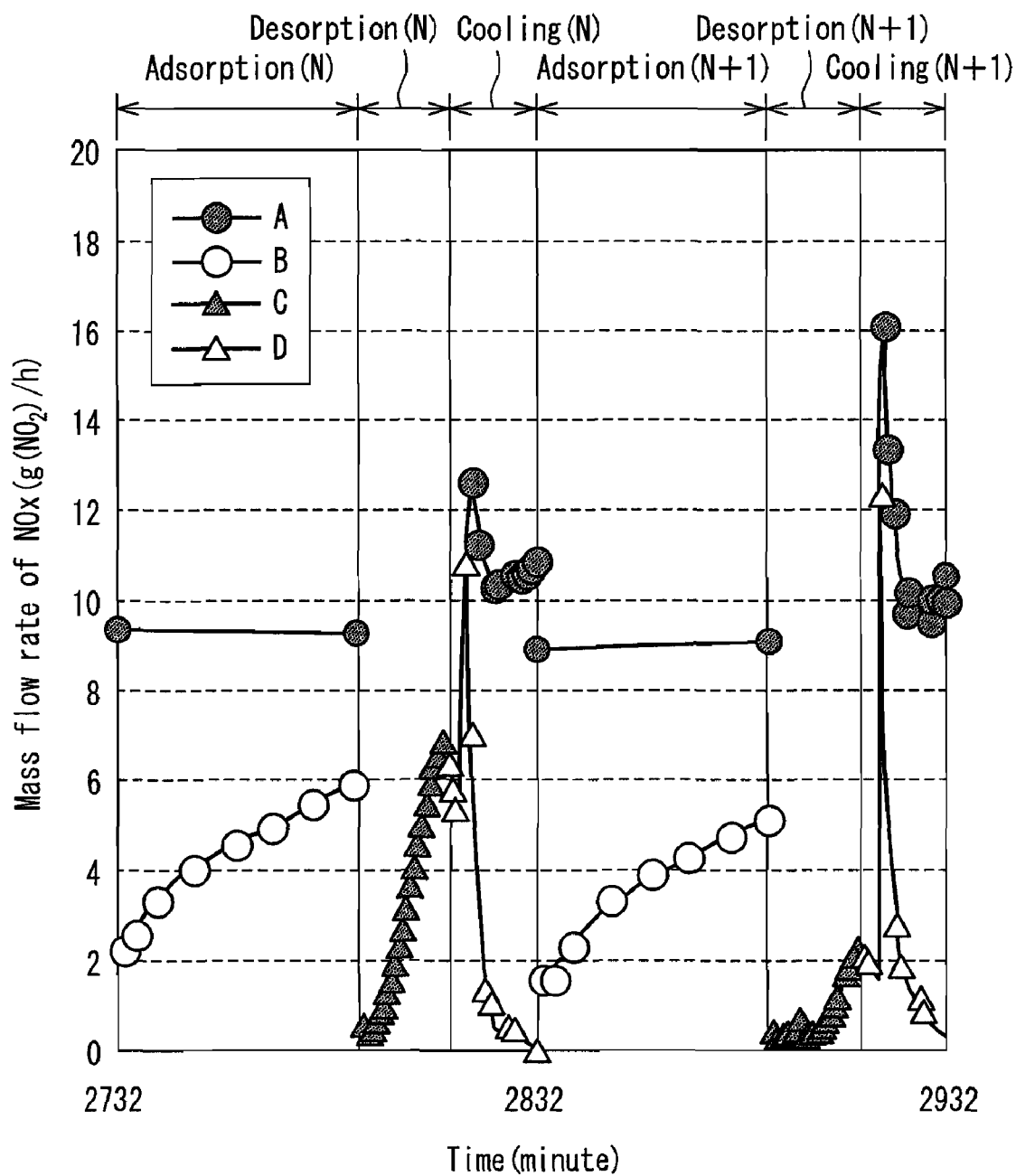
FIG. 11 shows the results of measurement of a mass flow rate of $NO_X$ in Example 1.

FIG. 11 shows the results of measurement of the mass flow rate of $NO_X$ at each point in a period of 200 minutes from 2732 to 2932 minutes after the start of the operation, and the Nth repeating unit and the (N+1)th repeating unit were performed during the period. The horizontal axis represents the elapsed time and the vertical axis represents the conversion amount obtained by converting the mass flow rate of $NO_X$ to the mass flow rate of $NO_2$. The mass flow rate directly expresses a burden on the environment. For example, if the mass flow rate of $NO_X$ is 10 g ($NO_2$)/h, it corresponds to a $NO_X$ concentration of 280 ppm in the case of an engine of 200 cc displacement (i.e., an exhaust gas flow rate of $300 \times 10^{-3}$ Nm$^3$/min). The plasma reactor 30 was not operated in the Nth desorption process, but was operated in the (N+1)th desorption process.

As shown in FIG. 11, in the Nth adsorption process ("Adsorption (N)") and the (N+1)th adsorption process ("Adsorption (N+1)"), the mass flow rate of $NO_X$ was reduced significantly at the point B located downstream of the adsorption tower 20, compared to the point A located near the outlet 10e of the engine 10. Thus, it is evident that $NO_X$ was removed stably by the adsorption tower 20.

The conversion amounts to $NO_2$ that passed through the point A located near the outlet 10e of the engine 10 during a period of 60 minutes in the Nth adsorption process and a period of 60 minutes in the (N+1)th adsorption process were multiplied by ⅓ (=20 min/60 min), yielding the conversion amounts to $NO_2$ $AA_N$ 3.11 g ($NO_2$) and $AA_{N+1}$ 3.01 g ($NO_2$), respectively. The conversion amounts to $NO_2$ that passed through the point A located near the outlet 10e of the engine 10 during a period of 20 minutes in the Nth cooling process ("Cooling (N)") and a period of 20 minutes in the (N+1)th cooling process ("Cooling (N+1)") were $AC_N$ 3.66 g ($NO_2$) and $AC_{N+1}$ 3.41 g ($NO_2$), respectively. On the other hand, the conversion amounts to $NO_2$ that entered (i.e., passed through the point D) the inlet 10i of the engine 10 during a period of 20 minutes in the Nth cooling process ("Cooling (N)") and a period of 20 minutes in the (N+1)th cooling process ("Cooling (N+1)") were $D_N$ 1.18 g ($NO_2$) and $D_{N+1}$ 1.83 g ($NO_2$), respectively.

As a result, $AA_N < AC_N$ and $AA_{N+1} < AC_{N+1}$ were established. In the cooling process, the cooling gas that passed through the adsorption layer of the adsorption tower 20 was introduced into the inlet 10i of the engine 10, so that the conversion amount to $NO_2$ in the exhaust gas from the engine 10 was increased. This is because the cooling gas that passed through the adsorption layer of the adsorption tower 20 contained $NO_X$ and entered the inlet 10i of the engine 10.

However, $AC_N - AA_N < D_N$ and $AC_{N+1} - AA_{N+1} < D_{N+1}$ were established. In the cooling process, the increment of the conversion amount to $NO_2$ in the exhaust gas from the engine 10 by introducing the cooling gas containing $NO_X$ into the inlet 10i of the engine 10 was smaller than the conversion amount to $NO_2$ introduced into the inlet 10i of the engine 10. This is because $NO_X$ in the intake air was decomposed by the engine 10, as described above.

The mass flow rate of $NO_X$ at the point C located downstream of the plasma reactor 30 was reduced significantly in the (N+1)th desorption process ("Desorption (N+1)") in which the plasma reactor 30 was operated, compared to the Nth desorption process ("Desorption (N)") in which the plasma reactor 30 was not operated, and almost no $NO_X$ was released into the atmosphere. The energy supplied externally to the plasma treatment apparatus was only 120 W, which was consumed by the plasma reactor 30 to generate plasma. The ratio of the energy to the load of the engine is expressed by (120 W×20 min)/{1 kW×(20 min+20 min+60 min)}× 100%=2.4%. Thus, even if the plasma reactor 30 is operated in the desorption process, $NO_X$ can be treated with a very small amount of energy consumption.

Example 2

The following is an example in which $NO_X$ in an exhaust gas emitted from a diesel engine was treated using the exhaust gas treating apparatus for performing the operations of FIGS. 3A to 3C, as described in Embodiment 2.

A diesel engine (YDG-200VS-6E manufactured by YANMAR Co., Ltd.) with a displacement of $2.19 \times 10^{-4}$ m$^3$ (219 cc) was used as the engine 10. The desorption tower 20 shown in FIGS. 6A to 6C was used, in which nine layers of the heat transfer paths 27 and ten layers of the adsorption layers 26 were arranged alternately next to each other. Each of the adsorption layers 26 was provided with the corrugated heat-transfer fin 29 and filled with adsorbent pellets having a bulk volume of $2 \times 10^{-3}$ m$^3$ (2 L). As the adsorbent 26a, Mn—Cu composite oxide pellets supporting 1 wt % of potassium ruthenate were prepared.

A 40 minutes adsorption process (FIG. 3A), a 15 minutes desorption process (FIG. 3B), and a 10 minutes cooling process (FIG. 3C) were repeated as a repeating unit. In the desorption process, the flow rate of the exhaust gas emitted from the engine 10 was $300 \times 10^{-3}$ Nm$^3$/min, of which $270 \times 10^{-3}$ Nm$^3$/min was released into the atmosphere and the remainder, i.e., $30 \times 10^{-3}$ Nm$^3$/min passed through the valve 61, the adsorption layer of the adsorption tower 20, and the valve 77 in this order and was introduced into the inlet 10i of the engine 10. In addition to the exhaust gas, air that passed through the valve 71 at a flow rate of $280 \times 10^{-3}$ Nm$^3$/min was introduced into the inlet 10i of the engine 10. In the cooling process, air was introduced as a cooling gas from the valve 75 at a flow rate of 150×10$^{-3}$ Nm$^3$/min. In this example, the unit "Nm$^3$/min" indicates a volume flow rate under the standard conditions (0° C., atmospheric pressure). The load of the engine 10 was 1 kW.

As shown in FIGS. 3A to 3C, the concentration (ppm) of NO$_X$ in the gas was measured at a point A in the flow path between the outlet 10e of the engine 10 and the valves 72, 73.

In the adsorption process, as shown in FIG. 3A, the concentration (ppm) of NO$_X$ in the gas was measured at a point B in the flow path that was downstream of the adsorption layer of the adsorption tower 20 in addition to the point A.

In the desorption process and the cooling process, as shown in FIGS. 3B and 3C, the concentration (ppm) of NO$_X$ in the gas was measured at a point D in the flow path between the adsorption layer of the adsorption tower 20 and the inlet 10i of the engine 10 in addition to the point A.

A portable gas analyzer PG-235 manufactured by HORIBA, Ltd. was used to measure the NO$_X$ concentration at each point. A mass flow rate of NO$_X$ was determined from the measured NO$_X$ concentration.

Figure 12:
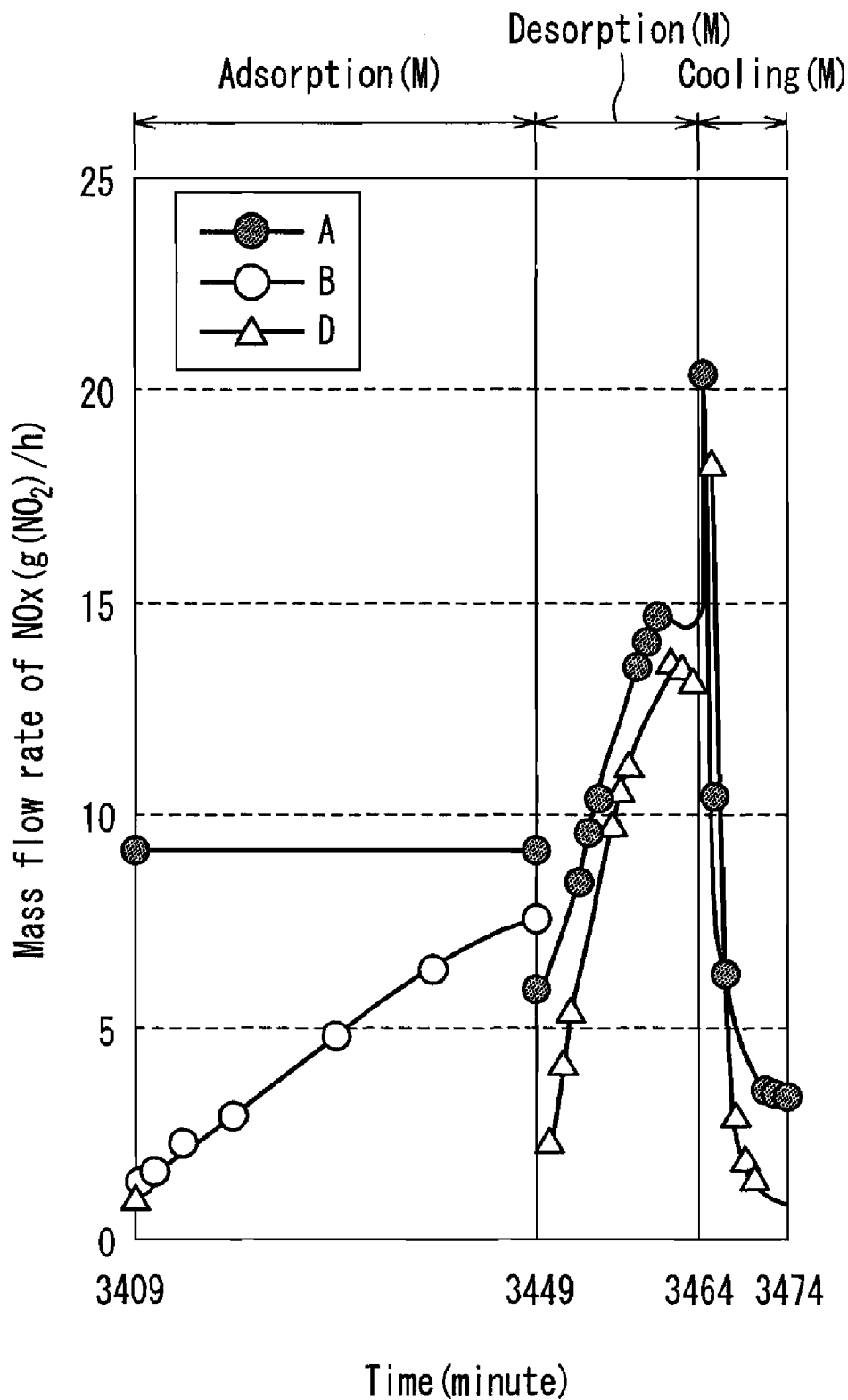
FIG. 12 shows the results of measurement of a mass flow rate of $NO_x$ in Example 2.

FIG. 12 shows the results of measurement of the mass flow rate of NO$_X$ at each point in a period of 65 minutes from 3409 to 3474 minutes after the start of the operation, and the Mth repeating unit was performed during the period. The horizontal axis represents the elapsed time and the vertical axis represents the conversion amount of the mass flow rate of NO$_X$ to the mass flow rate of NO$_2$.

As shown in FIG. 12, in the Mth adsorption process ("Adsorption (M)"), the mass flow rate of NO$_X$ was reduced significantly at the point B located downstream of the adsorption tower 20, compared to the point A located near the outlet 10e of the engine 10. Thus, it is evident that NO$_X$ was removed stably by the adsorption tower 20.

The conversion amount to NO$_2$ that entered the inlet 10i of the engine 10 and was measured at the point D during a period of 15 minutes in the Mth desorption process ("Desorption (M)") was D$_M$ 2.11 g (NO$_2$). On the other hand, the conversion amount to NO$_2$ that was emitted from the outlet 10e of the engine 10 and measured at the point A during a period of 15 minutes in the Mth desorption process ("Desorption (M)") was A$_M$ 2.36 g (NO$_2$). The conversion amount to NO$_2$ that was emitted from the outlet 10e of the engine 10 and measured at the point A during a period of 40 minutes in the Mth adsorption process ("Adsorption (M)") was multiplied by 15/40, yielding the conversion amount to NO$_2$ AA$_M$ 1.86 g (NO$_2$) per 15 minutes.

As a result, AA$_M$<A$_M$ was established. In the desorption process, the exhaust gas that passed through the adsorption layer of the adsorption tower 20 was introduced into the inlet 10i of the engine 10, so that the conversion amount to NO$_2$ in the exhaust gas from the engine 10 was increased. This is because the exhaust gas that passed through the adsorption layer of the adsorption tower 20 contained NO$_X$ and entered the inlet 10i of the engine 10.

However, A$_M$-AA$_M$<D$_M$ was established. In the desorption process, the increment of the conversion amount to NO$_2$ in the exhaust gas from the engine 10 by introducing the exhaust gas that passed through the adsorption layer of the adsorption tower 20 and contained NO$_X$ into inlet 10i of the engine 10 was smaller than the conversion amount to NO$_2$ introduced into the inlet 10i of the engine 10. This is because NO$_X$ in the intake air was decomposed by the engine 10, as described above. The reduced amount of NO$_X$ emission due to the introduction of the exhaust gas that passed through the adsorption layer of the adsorption tower 20 into the inlet 10i of the engine 10 in the desorption process was 2.11−(2.36−1.86)=1.61 g (NO$_2$). Thus, even if the plasma reactor is not used, the amount of NO$_X$ emitted outside the system can be reduced.

All of the above-described embodiments and examples are strictly intended to clarify the technical contents of the present invention. The present invention should not be interpreted as being limited to such specific examples, but should be broadly interpreted, and various modifications of the invention can be made within the spirit and scope of the invention as set forth in the appended claims.

INDUSTRIAL APPLICABILITY

The field of application of the present invention is not particularly limited, and the present invention can be used widely as an apparatus for treating an exhaust gas containing NO$_X$.

The invention claimed is:

1. An exhaust gas treating apparatus for treating an exhaust gas emitted from an outlet of an engine, comprising:
   an adsorption tower that has an adsorption layer filled with an adsorbent and a heat transfer path located within the adsorption tower through which heat is transferred to the adsorption layer;
   a first exhaust gas flow path from the outlet of the engine through a branch point (A) to the adsorption layer that introduces the exhaust gas emitted from the outlet of the engine into the adsorption layer of the adsorption tower;
   a second exhaust gas flow path from the outlet of the engine through the branch point (A) to the heat transfer path that introduces the exhaust gas emitted from the outlet of the engine into the heat transfer path of the adsorption tower, wherein a path between the outlet of the engine and the branch point (A) is a single common path for the first exhaust gas flow path and the second exhaust as flow path, and the first exhaust gas flow path is separated from the second exhaust gas flow path at the branch point (A);
   a first desorption gas flow path that introduces a desorption gas into the adsorption layer;
   a first cooling gas flow path that introduces a cooling gas into the adsorption layer; and
   a second cooling gas flow path between the adsorption layer and an inlet of the engine, which introduces the cooling gas that has passed through the adsorption layer into the inlet of the engine.

2. The exhaust gas treating apparatus according to claim 1, wherein the adsorption layer and the heat transfer path are independent of each other.

3. The exhaust gas treating apparatus according to claim 1, further comprising the cooling gas that is introduced into the adsorption layer and includes the exhaust gas emitted from the outlet of the engine.

4. The exhaust gas treating apparatus according to claim 1, further comprising a plasma reactor in which the desorption gas that has passed through the adsorption layer is subjected to a plasma treatment.

5. The exhaust gas treating apparatus according to claim 4, wherein the plasma reactor comprises a surface discharge element that generates surface discharge.

6. The exhaust gas treating apparatus according to claim 5, wherein the plasma reactor has a gas flow control shape for controlling a flow path of the desorption gas so that the desorption gas flows along a surface of the surface discharge element on which the surface discharge is generated.

7. The exhaust gas treating apparatus according to claim 4, further comprising the desorption gas, which is a low oxygen gas including oxygen in an amount of 10 vol % or less.

8. The exhaust gas treating apparatus according to claim 7, wherein the low oxygen gas is at least a part of the exhaust gas that has passed through the heat transfer path.

9. The exhaust gas treating apparatus according to claim 1, further comprising a desorption gas circulation path that introduces a part of the desorption gas that has passed through the adsorption layer into the adsorption layer.

10. The exhaust gas treating apparatus according to claim 1, further comprising a second desorption gas flow path between the adsorption layer and the inlet of the engine, which introduces the desorption gas that has passed through the adsorption layer into the inlet of the engine.

11. The exhaust gas treating apparatus according to claim 10, further comprising the desorption gas, which comprises the exhaust gas.

12. The exhaust gas treating apparatus according to claim 11, wherein the desorption gas is at least a part of the exhaust gas that has passed through the heat transfer path.

13. The exhaust gas treating apparatus according to claim 1, further comprising a dehumidifying agent that dehumidifies the exhaust gas that passes through the adsorption layer.

14. The exhaust gas treating apparatus according to claim 1, further comprising the cooling gas, which comprises air.

15. The exhaust gas treating apparatus according to claim 1, wherein the first exhaust gas flow path and the second gas flow path are open alternately.

16. An exhaust gas treating method for treating an exhaust gas emitted from an engine using an adsorption tower that has an adsorption layer filled with an adsorbent and a heat transfer path located within the adsorption tower through which heat is transferred to the adsorption layer, the method comprising switching among the following processes:

an adsorption process of introducing the exhaust gas into the adsorption layer of the adsorption tower so that target components to be treated, including $NO_X$, in the exhaust gas are adsorbed by the adsorbent;

a desorption process of introducing the exhaust gas, with which the adsorption layer is heated, into the heat transfer path of the adsorption tower and introducing a desorption gas into the heated adsorption layer so that the target components are desorbed from the adsorbent; and a cooling process of introducing a cooling gas into the adsorption layer in the adsorption tower, by which the adsorption layer is cooled, and introducing the cooling gas that has passed through the adsorption layer into an inlet of the engine.

17. The exhaust gas treating method according to claim 16, using a plurality of the adsorption towers and switching between the plurality of the adsorption towers every time a set of three processes consisting of the adsorption process, the desorption process, and the cooling process is performed, each adsorption tower performing the three processes.

18. The exhaust gas treating method according to claim 17, wherein one of the plurality of the adsorption towers is used to perform a set of three processes consisting of the adsorption process, the desorption process, and the cooling process, while the adsorbent of the other adsorption tower adsorbs the target components including $NO_X$ in the exhaust gas.

* * * * *